United States Patent
Du

(10) Patent No.: US 12,155,961 B2
(45) Date of Patent: Nov. 26, 2024

(54) VIDEO SPECIAL EFFECT GENERATION METHOD AND TERMINAL

(71) Applicant: HUAWEI TECHNOLOGIES CO., LTD., Shenzhen (CN)

(72) Inventor: Le Du, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/674,918

(22) Filed: Feb. 18, 2022

(65) Prior Publication Data

US 2022/0174237 A1 Jun. 2, 2022

Related U.S. Application Data

(63) Continuation of application No. PCT/CN2020/100840, filed on Jul. 8, 2020.

(30) Foreign Application Priority Data

Aug. 20, 2019 (CN) .......................... 201910769084.8

(51) Int. Cl.
| | |
|---|---|
| *H04N 5/783* | (2006.01) |
| *G11B 27/034* | (2006.01) |
| *G11B 27/34* | (2006.01) |
| *H04N 5/262* | (2006.01) |
| *H04N 23/67* | (2023.01) |

(52) U.S. Cl.
CPC .......... *H04N 5/783* (2013.01); *G11B 27/034* (2013.01); *G11B 27/34* (2013.01); *H04N 5/262* (2013.01); *H04N 23/67* (2023.01)

(58) Field of Classification Search
CPC ........ H04N 5/783; H04N 23/67; H04N 5/262; G11B 27/034; G11B 27/34
See application file for complete search history.

(56) References Cited

U.S. PATENT DOCUMENTS

| | | |
|---|---|---|
| 8,295,687 B1 | 10/2012 | Kuspa |
| 9,253,229 B1 | 2/2016 | Strothmann et al. |
| 9,966,108 B1* | 5/2018 | Matias ................ G11B 27/022 |
| 2002/0136528 A1 | 9/2002 | Dagtas |
| 2005/0207733 A1 | 9/2005 | Gargi |
| 2010/0100212 A1 | 4/2010 | Lindahl et al. |

(Continued)

FOREIGN PATENT DOCUMENTS

| | | |
|---|---|---|
| CA | 2928401 A1 | 10/2017 |
| CN | 101018324 A | 8/2007 |

(Continued)

*Primary Examiner* — Girumsew Wendmagegn
(74) *Attorney, Agent, or Firm* — Maier & Maier, PLLC

(57) ABSTRACT

The embodiments provide a video special effect generation method and a terminal. The method includes: obtaining, by a terminal, target information of a first video segment in a target video, where the target information includes one or more of a content feature of the first video segment and a photographing parameter of the first video segment; determining, by the terminal, a first play speed of the first video segment based on the target information of the first video segment; and then adjusting, by the terminal, a play speed of the first video segment to the first play speed. According to the embodiments, video editing efficiency can be improved.

17 Claims, 15 Drawing Sheets

(56) References Cited

U.S. PATENT DOCUMENTS

| | | | |
|---|---|---|---|
| 2013/0031266 A1* | 1/2013 | Gilson | H04N 5/783 |
| | | | 709/232 |
| 2013/0080895 A1 | 3/2013 | Rossman et al. | |
| 2013/0129308 A1* | 5/2013 | Karn | H04N 21/47217 |
| | | | 386/230 |
| 2014/0123195 A1 | 5/2014 | Han et al. | |
| 2015/0098691 A1* | 4/2015 | Avrahami | G11B 27/28 |
| | | | 386/241 |
| 2015/0365675 A1 | 12/2015 | Liang et al. | |
| 2016/0365113 A1* | 12/2016 | Matsuoka | G11B 27/105 |
| 2017/0200314 A1 | 7/2017 | Jeong | |

FOREIGN PATENT DOCUMENTS

| | | |
|---|---|---|
| CN | 101600107 A | 12/2009 |
| CN | 102117638 A | 7/2011 |
| CN | 104270565 A | 1/2015 |
| CN | 104702919 A | 6/2015 |
| CN | 104735385 A | 6/2015 |
| CN | 104811798 A | 7/2015 |
| CN | 104869430 A | 8/2015 |
| CN | 104980794 A | 10/2015 |
| CN | 105072328 A | 11/2015 |
| CN | 105100692 A | 11/2015 |
| CN | 105554399 A | 5/2016 |
| CN | 105959717 A | 9/2016 |
| CN | 106027897 A | 10/2016 |
| CN | 106534938 A | 3/2017 |
| CN | 106559635 A | 4/2017 |
| CN | 106791408 A | 5/2017 |
| CN | 107105314 A | 8/2017 |
| CN | 107197349 A | 9/2017 |
| CN | 107360365 A | 11/2017 |
| CN | 107682742 A | 2/2018 |
| CN | 107770595 A | 3/2018 |
| CN | 108235123 A | 6/2018 |
| CN | 108401193 A | 8/2018 |
| CN | 108665518 A | 10/2018 |
| CN | 108881765 A | 11/2018 |
| CN | 109218810 A | 1/2019 |
| CN | 109587560 A | 4/2019 |
| CN | 109819161 A | 5/2019 |
| CN | 110139160 A | 8/2019 |
| CN | 112422804 B | 6/2022 |
| JP | 2012109673 A | 6/2012 |
| WO | 2015087915 A1 | 6/2015 |
| WO | 2018085982 A1 | 5/2018 |

\* cited by examiner

VIDEO SPECIAL EFFECT GENERATION METHOD AND TERMINAL

CROSS-REFERENCE TO RELATED APPLICATIONS

This application is a continuation of International Application No. PCT/CN2020/100840, filed on Jul. 8, 2020, which claims priority to Chinese Patent Application No. 201910769084.8, filed on Aug. 20, 2019, the disclosures of the aforementioned applications are hereby incorporated by reference in their entireties.

TECHNICAL FIELD

The embodiments relate to the field of video processing technologies, a video special effect generation method, and a terminal.

BACKGROUND

As an information fragmentation trend continues to intensify, as a new medium form, a short video becomes a best carrier for quickly being in contact with information. With maturity of the 5G technology, an application scenario of the short video is greatly enriched. Slow motion and time-lapse photography already exist in an existing video rhythm adjustment technology. When a slow motion mode is selected to perform photographing, photographed content is automatically presented slowly. When the slow motion is used to photograph a quickly moved object or photograph a movement scenario, a special viewing effect can be presented. When the time-lapse photography is selected to perform photographing, a long-time process in which photographed content slowly changes is compressed into relatively short time, and a marvelous scene that is usually undetectable by naked eyes can be presented.

However, currently, slow motion and time-lapse photography provided on a terminal only provide corresponding functions. To photograph a video with a sense of art, a user needs to have artistic skill. A common user lacks plenty of experience in controlling a video rhythm, and a video photographed by the user has a single rhythm, lacks artistic expressiveness, and is not worth viewing and has no sharing value. Although a photographed video can be edited again to enrich a rhythm of the video to make the video more worth viewing, a fast/slow motion effect is inconvenient to edit, and a user needs to have strong editing experience and artistic skill. If the user has no strong editing experience and artistic skill, the user cannot obtain, through editing, a video work with rich rhythms and a high sharing value. Therefore, how a user simply and quickly obtains a video work with rich rhythms and a high sharing value when the user lacks an artistic skill is a problem that is being studied by a person skilled in the art.

SUMMARY

Embodiments disclose a video special effect generation method and a terminal, to improve video editing efficiency, thereby simply and quickly obtaining a video work with rich rhythms and a high sharing value.

According to a first aspect, an embodiment discloses a video special effect generation method. The method includes: obtaining, by a terminal, target information of a first video segment in a target video, where the target information includes one or more of a content feature of the first video segment and a photographing parameter of the first video segment; determining, by the terminal, a first play speed of the first video segment based on the target information of the first video segment; and adjusting, by the terminal, a play speed of the first video segment to the first play speed.

Compared with a conventional technology in which a play speed of a video needs to be manually edited, which imposes a strict requirement on an artistic skill and an editing capability, in this embodiment, a user does not need to have the artistic skill and the editing capability. A device automatically determines a play speed of a photographed video based on content in the video (for example, a scenario presented in the video) or some parameters (for example, a focal length) used when the video is photographed, and then intelligently adjusts the play speed of the video, so as to simply and quickly obtain a video work with rich rhythms and a high sharing value. Therefore, editing efficiency is greatly improved, and this embodiment is applicable to more users.

In some implementations, the adjusting a play speed of the first video segment to the first play speed includes: playing the first video segment at the first play speed. The "adjusting" herein means "changing" the play speed in some implementations and means "setting" the play speed in some other implementations.

A play speed may be a fast or slow video play speed. Adjustment of the play speed is not limited to adjustment of a value of the "rate", and a rate change may also be implemented by adjusting another related parameter. For example, a play speed=a length of a played video/play time, and in this case, the play speed may be adjusted by adjusting the play time.

In some implementations, the first video segment refers to some segments in the target video or the target video.

In some implementations, the method is performed when the target video is photographed, when the target video is stored, or before the target video or the first video segment is played.

In a possible implementation, the determining, by the terminal, a first play speed of the first video segment based on the target information of the first video segment includes: determining, by the terminal, a first video type of the first video segment based on the target information of the first video segment; and obtaining, by the terminal through matching from a preset special effect mapping relationship, the first play speed corresponding to the first video type of the first video segment. The special effect mapping relationship defines a correspondence between each of a plurality of video types and each of a plurality of play speeds. In another possible implementation, the first play speed may be obtained through calculation by using a mathematical model. Input of the model is one or more types of target information of the first video segment, and output of the model is the first play speed.

It should be noted that for determining of a video type, in implementation, there may be a parameter corresponding to the video type to represent the video type; or there may be no such parameter, and a video segment is directly played based on the following various cases at a corresponding play speed. For the latter implementation, a video classification function exists, but a parameter code with a name of "video type" does not exist. Because there may be a plurality of code implementations, the code implementations are not enumerated one by one herein.

In a possible implementation, the target information of the first video segment includes the content feature of the first video segment, and the content feature of the first video segment includes information about a picture scenario in the first video segment.

In a possible implementation, the obtaining, by the terminal through matching from a preset special effect mapping relationship, the first play speed corresponding to the first video type of the first video segment includes: when the first video type is a video type such as running water, rainy/snowy weather, or a close-up of an animal, obtaining, by the terminal through matching from the preset special effect mapping relationship, that the first play speed corresponding to the first video type is a slow motion play speed; and when the first video type is a video type such as a street or a natural scene, obtaining, by the terminal through matching from the preset special effect mapping relationship, that the first play speed corresponding to the first video type is a fast motion play speed. The two cases may also be implemented by using the foregoing mathematical model. The following various cases may also be implemented by using the foregoing mathematical model, and details are not described again.

In this embodiment, each picture scenario type correspondingly matches a play speed in the special effect mapping relationship, and a play speed of a video segment is determined by analyzing a picture scenario in the video segment, thereby increasing viewable performance of the video segment. In addition, in this embodiment, the play speed corresponding to each picture scenario type is matched in the special effect mapping relationship in advance, so that a corresponding play speed can be determined from the special effect mapping relationship as long as a picture scenario type is obtained through analysis based on a video segment, thereby improving editing efficiency of the video segment.

In a possible implementation, the target information of the first video segment includes the photographing parameter of the first video segment, and the photographing parameter of the first video segment includes a photographing focal length of the first video segment.

In a possible implementation, the obtaining, by the terminal through matching from a preset special effect mapping relationship, the first play speed corresponding to the first video type of the first video segment includes: when the first video type is a video type whose photographing focal length falls within a first focal length range, obtaining, by the terminal through matching from the preset special effect mapping relationship, that the first play speed corresponding to the first video type is the slow motion play speed; and when the first video type is a video type whose photographing focal length falls within a second focal length range, obtaining, by the terminal through matching from the preset special effect mapping relationship, that the first play speed corresponding to the first video type is the fast motion play speed. Any focal length in the first focal length range is greater than any focal length in the second focal length range.

It should be noted that when a user uses a short focus mode to photograph a video, it indicates that the user pays attention to details of a scenario picture in the video. Alternatively, when a user uses a long focus or a wide angle to photograph a video, it indicates that the user pays attention to global information of a scenario picture in the video. Therefore, in this embodiment, a play speed of a video segment photographed in the short focus mode is matched to the slow motion play speed, so that more details of a scenario picture are displayed when the video segment is played. A play speed of a video segment photographed by using the long focus or the wide angle is matched to the fast motion play speed, so that global information of a scenario picture can be quickly displayed when the video segment is played. In this way, a better viewing effect is presented to the user.

In a possible implementation, the target information of the first video segment includes the content feature of the first video segment, and the content feature of the first video segment includes photographing duration of the first video segment.

In a possible implementation, the obtaining, by the terminal through matching from a preset special effect mapping relationship, the first play speed corresponding to the first video type of the first video segment includes: when the first video type is a video type whose photographing duration falls within a first preset duration range, obtaining, by the terminal through matching from the preset special effect mapping relationship, that the first play speed corresponding to the first video type is the slow motion play speed; and when the first video type is a video type whose photographing duration falls within a second preset duration range, obtaining, by the terminal through matching from the preset special effect mapping relationship, that the first play speed corresponding to the first video type is the fast motion play speed. Any duration in the first preset duration range is less than any duration in the second preset duration range.

It should be noted that when a user takes relatively long time to photograph a video, it indicates that the user pays attention to an entire process displayed by a scenario picture in the video. Alternatively, when a user photographs a video with relatively short time, it indicates that the user pays more attention to details of a scenario picture in the video. Therefore, in this embodiment, a play speed of a video segment with relatively long photographing duration is matched to the fast motion play speed, so that an entire process of a scenario picture can be quickly displayed when the video segment is played. A play speed of a video segment with relatively short photographing duration is matched to the slow motion play speed, so that more details of a scenario picture can be displayed when the video segment is played. In this way, a special viewing effect is presented to the user.

In a possible implementation, the target information of the first video segment includes the content feature of the first video segment, and the content feature of the first video segment includes a picture change in the first video segment.

In a possible implementation, the obtaining, by the terminal through matching from a preset special effect mapping relationship, the first play speed corresponding to the first video type of the first video segment includes: when the first video type is a video type whose picture change speed falls within a first change speed range, obtaining, through matching from the preset special effect mapping relationship, that the first play speed corresponding to the first video type is the slow motion play speed; and when the first video type is a video type whose picture change speed falls within a second change speed range, obtaining, through matching from the preset special effect mapping relationship, that the first play speed corresponding to the first video type is the fast motion play speed. Any speed in the first change speed range is greater than any speed in the second change speed range.

It should be noted that when a picture in a video photographed by a user changes rapidly, the user may pay attention to details of a scenario picture in the video. Alternatively, when a picture in a video photographed by a user changes slowly, the user may pay attention to an entire change process of a scenario picture in the video. Therefore, in this embodiment, a play speed of a video segment whose picture changes rapidly is matched to the slow motion play speed, so that more details of a scenario picture can be displayed when the video segment is played. A play speed of a video segment whose picture changes slowly is matched to the fast motion play speed, so that an entire change process of a scenario picture can be quickly displayed when the video segment is played. In this way, a video meeting a viewing requirement is presented to the user.

In a possible implementation, the target information of the first video segment includes at least two types of information in the following information: information about a picture scenario in the first video segment, a photographing focal length of the first video segment, photographing duration of the first video segment, and a picture change in the first video segment. The determining, by the terminal, a first play speed of the first video segment based on the target information of the first video segment includes: determining, by the terminal, at least two play speed results of the first video segment based on the at least two types of information, where each play speed result is determined based on one of the at least two types of information; and determining, by the terminal, the first play speed of the first video segment based on the at least two play speed results.

In this embodiment, a play speed of a video segment is determined from the special effect mapping relationship by combining a plurality of pieces of information of the video segment, which helps further optimize a viewing effect of the video segment and improves a sharing value of the video segment.

In a possible implementation, the first play speed is a play speed that appears a maximum quantity of times in play speeds represented by the at least two play speed results.

In a possible implementation, the method further includes: obtaining, by the terminal, target information of a second video segment in the target video, where the target information includes one or more of a content feature of the second video segment and a photographing parameter of the second video segment; determining, by the terminal, a second play speed of the second video segment based on the target information of the second video segment; and adjusting, by the terminal, a play speed of the second video segment to the second play speed.

This embodiment indicates that play speeds of a plurality of video segments included in a video may be separately adjusted, which helps further enrich a play rhythm of the video.

In a possible implementation, the obtaining, by a terminal, target information of a first video segment in a target video includes: obtaining, by the terminal, the target information of the first video segment in the target video in a process of photographing the target video.

In this embodiment, a play speed of a video is adjusted in a process of photographing the video, so that a user can see an effect immediately after completing the photographing, thereby improving user experience while improving editing efficiency.

Determining of the first play speed in the foregoing various cases may be used in combination. A play speed may be determined by a user or selected by default.

According to a second aspect, an embodiment provides a terminal, and the terminal includes a processor and a memory. The memory stores a computer program. The processor is configured to invoke the computer program to perform the following operations: obtaining target information of a first video segment in a target video, where the target information includes one or more of a content feature of the first video segment and a photographing parameter of the first video segment; determining a first play speed of the first video segment based on the target information of the first video segment; and adjusting a play speed of the first video segment to the first play speed.

Compared with a conventional technology in which a play speed of a video needs to be manually edited, which imposes a strict requirement on an artistic skill and an editing capability, in this embodiment, a user does not need to have the artistic skill and the editing capability. A device automatically determines a play speed of a photographed video based on content in the video (for example, a scenario presented in the video) or some parameters (for example, a focal length) used when the video is photographed, and then intelligently adjusts the play speed of the video, so as to simply and quickly obtain a video work with rich rhythms and a high sharing value. Therefore, editing efficiency is greatly improved, and this embodiment is applicable to more users.

In a possible implementation, the determining, by the processor, a first play speed of the first video segment based on the target information of the first video segment is: determining a first video type of the first video segment based on the target information of the first video segment; and obtaining, through matching from a preset special effect mapping relationship, the first play speed corresponding to the first video type of the first video segment. The special effect mapping relationship defines a correspondence between each of a plurality of video types and each of a plurality of play speeds. In another possible implementation, the processor may obtain the first play speed through calculation by using a mathematical model. Input of the model is one or more types of target information of the first video segment, and output of the model is the first play speed.

In a possible implementation, the target information of the first video segment includes the content feature of the first video segment, and the content feature of the first video segment includes information about a picture scenario in the first video segment.

In a possible implementation, the matching, by the processor from a preset special effect mapping relationship, the first play speed corresponding to the first video type of the first video segment is: when the first video type is a video type such as running water, rainy/snowy weather, or a close-up of an animal, obtaining, through matching from the preset special effect mapping relationship, that the first play speed corresponding to the first video type is a slow motion play speed; and when the first video type is a video type such as a street or a natural scene, obtaining, through matching from the preset special effect mapping relationship, that the first play speed corresponding to the first video type is a fast motion play speed. The two cases may also be implemented by using the foregoing mathematical model. The following various cases may also be implemented by using the foregoing mathematical model, and details are not described again.

In a possible implementation, the target information of the first video segment includes the photographing parameter of the first video segment, and the photographing parameter of the first video segment includes a photographing focal length of the first video segment.

In a possible implementation, the matching, by the processor from a preset special effect mapping relationship, the first play speed corresponding to the first video type of the first video segment is: when the first video type is a video type whose photographing focal length falls within a first focal length range, obtaining, through matching from the preset special effect mapping relationship, that the first play speed corresponding to the first video type is the slow motion play speed; and when the first video type is a video type whose photographing focal length falls within a second focal length range, obtaining, through matching from the preset special effect mapping relationship, that the first play speed corresponding to the first video type is the fast motion play speed. Any focal length in the first focal length range is greater than any focal length in the second focal length range.

In a possible implementation, the target information of the first video segment includes the content feature of the first video segment, and the content feature of the first video segment includes photographing duration of the first video segment.

In a possible implementation, the matching, by the processor from a preset special effect mapping relationship, the first play speed corresponding to the first video type of the first video segment is: when the first video type is a video type whose photographing duration falls within a first preset duration range, obtaining, through matching from the preset special effect mapping relationship, that the first play speed corresponding to the first video type is the slow motion play speed; and when the first video type is a video type whose photographing duration falls within a second preset duration range, obtaining, through matching from the preset special effect mapping relationship, that the first play speed corresponding to the first video type is the fast motion play speed. Any duration in the first preset duration range is less than any duration in the second preset duration range.

In a possible implementation, the target information of the first video segment includes the content feature of the first video segment, and the content feature of the first video segment includes a picture change in the first video segment.

In a possible implementation, the matching, by the processor from a preset special effect mapping relationship, the first play speed corresponding to the first video type of the first video segment is: when the first video type is a video type whose picture change speed falls within a first change speed range, obtaining, through matching from the preset special effect mapping relationship, that the first play speed corresponding to the first video type is the slow motion play speed; and when the first video type is a video type whose picture change speed falls within a second change speed range, obtaining, through matching from the preset special effect mapping relationship, that the first play speed corresponding to the first video type is the fast motion play speed. Any speed in the first change speed range is greater than any speed in the second change speed range.

In a possible implementation, the target information of the first video segment includes at least two types of information in the following information: information about a picture scenario in the first video segment, a photographing focal length of the first video segment, photographing duration of the first video segment, and a picture change in the first video segment. The determining, by the processor, a first play speed of the first video segment based on the target information of the first video segment is: determining at least two play speed results of the first video segment based on the at least two types of information, where each play speed result is determined based on one of the at least two types of information; and determining the first play speed of the first video segment based on the at least two play speed results.

In a possible implementation, the first play speed is a play speed that appears a maximum quantity of times in play speeds represented by the at least two play speed results.

In a possible implementation, the processor further performs the following operations: obtaining target information of a second video segment in the target video, where the target information includes one or more of a content feature of the second video segment and a photographing parameter of the second video segment; determining a second play speed of the second video segment based on the target information of the second video segment; and adjusting a play speed of the second video segment to the second play speed.

This embodiment indicates that play speeds of a plurality of video segments included in a video may be separately adjusted, which helps further enrich a play rhythm of the video.

In a possible implementation, the obtaining, by the processor, target information of a first video segment in a target video is: obtaining the target information of the first video segment in the target video in a process of photographing the target video.

In this embodiment, a play speed of a video is adjusted in a process of photographing the video, so that a user can see an effect immediately after completing the photographing, thereby improving user experience while improving editing efficiency.

According to a third aspect, an embodiment provides a terminal, and the terminal includes a unit configured to perform the method described in any one of the first aspect or the possible implementations of the first aspect.

According to a fourth aspect, an embodiment provides a chip system. The chip system includes at least one processor, a memory, and an interface circuit. The memory, the interface circuit, and the at least one processor are interconnected through a line, and the at least one memory stores a computer program. When the computer program is executed by the processor, the method described in any one of the first aspect or the possible implementations of the first aspect is implemented. The memory may alternatively be disposed outside the chip system, and the processor executes a computer program in the memory by using the interface circuit.

According to a fifth aspect, an embodiment provides a computer-readable storage medium. The computer-readable storage medium stores a computer program, and when the computer program is executed by a processor, the method described in any one of the first aspect or the possible implementations of the first aspect is implemented.

According to a sixth aspect, an embodiment provides a computer program product. When the computer program product is run on a processor, the method described in any one of the first aspect or the possible implementations of the first aspect is implemented.

In conclusion, compared with a conventional technology in which a play speed of a video needs to be manually edited, which imposes a strict requirement on an artistic skill and an editing capability, in this embodiment, a user does not need to have the artistic skill and the editing capability. A device automatically determines a play speed of a photographed video based on content in the video (for example, a scenario presented in the video) or some parameters (for example, a focal length) used when the video is photographed, and then intelligently adjusts the play speed of the video, so as to simply and quickly obtain a video work with rich rhythms and a high sharing value. Therefore, editing efficiency is greatly improved, and this embodiment is applicable to more users.

DETAILED DESCRIPTION OF THE EMBODIMENTS

The following describes the embodiments with reference to the accompanying drawings.

A terminal in the embodiments may include a handheld device (for example, a mobile phone, a tablet computer, or a palmtop computer), an in-vehicle device (for example, a vehicle, a bicycle, an electric vehicle, an airplane, a ship, or the like), a wearable device (for example, a smartwatch (such as iWatch), a smart band, or a pedometer), a smart household device (for example, a refrigerator, a television, an air conditioner, or a meter), a smart robot, a workshop device, various forms of user equipment (UE), a mobile station (MS), a terminal device, and the like. Optionally, the terminal usually supports a plurality of application programs, such as a camera application program, a word processing application program, a phone application program, an e-mail application program, an instant messaging application program, a photo management application program, a web browsing application program, a digital music player application program, and/or a digital video player application program.

Figure 1:
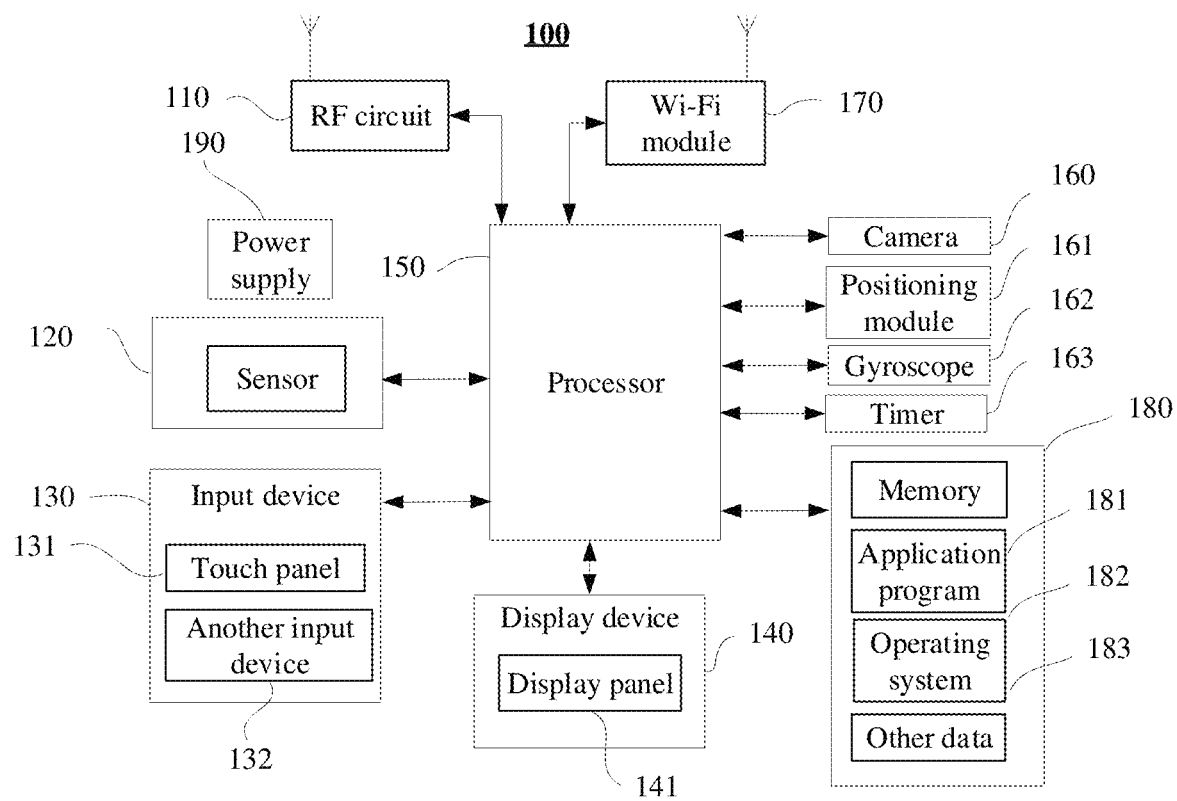
FIG. 1 is a schematic diagram of a structure of a terminal according to an embodiment.

FIG. 1 is a schematic diagram of a structure of a terminal 100 applied to an embodiment. The terminal 100 includes a memory 180, a processor 150, and a display device 140. The memory 180 stores a computer program, where the computer program includes an operating system program 182, an application program 181, and the like, and the application program 181 includes a browser program. The processor 150 is configured to read the computer program in the memory 180, and then perform a method defined by the computer program. For example, the processor 150 reads the operating system program 182, to run the operating system on the terminal 100 and implementing various functions of the operating system, or reads one or more application programs 181, to run an application on the terminal, for example, reading a camera application program to run a camera.

The processor 150 may include one or more processors. For example, the processor 150 may include one or more central processing units. When the processor 150 includes a plurality of processors, the plurality of processors may be integrated into a same chip or may be independent chips. One processor may include one or more processing cores. In the following embodiments, a multi-core processor is used as an example for description. However, a video special effect generation method provided in the embodiments may also be applied to a single-core processor.

In addition, the memory 180 further stores other data 183 in addition to the computer program. The other data 183 may include data generated after the operating system 182 or the application program 181 is run. The data includes system data (for example, a configuration parameter of an operating system) and user data, for example, target information that is of a target video and that is obtained by the terminal (for example, information about a picture scenario in the target video, photographing duration, and other information). In addition, all photographed video data can be further considered as the user data.

The memory 180 usually includes an internal memory and an external storage. The internal memory may be a random access memory (RAM), a read-only memory (ROM), a cache, or the like. The external storage may be a hard disk, an optical disk, a USB drive, a floppy disk, a tape drive, or the like. The computer program is usually stored in the external storage. Before performing processing, the processor loads the computer program from the external storage to the internal memory. A video in this embodiment may be stored in the external storage. When the video needs to be edited, the video that needs to be edited may be first loaded into the memory.

The operating system program 182 includes a computer program that can implement the video special effect generation method provided in the embodiments, so that after the processor 150 reads the operating system program 182 and runs the operating system, the operating system can have a video special effect generation function provided in the embodiments. Further, the operating system may open an invoking interface of the video special effect generation function to an upper-layer application. After the processor 150 reads the application program 181 from the memory 180 and runs the application, the application can invoke, through the invoking interface, the video special effect generation function provided by the operating system, to edit a video.

The terminal 100 may further include an input device 130, configured to: receive input digital information, character information or a contact touch operation/non-contact gesture, generate signal input that is related to user settings and function control of the terminal 100, and the like. In this embodiment, the input device 130 may include a touch panel 131. The touch panel 131, also referred to as a touchscreen, may collect a touch operation performed by a user on or near the touch panel 131 (for example, an operation performed by the user on the touch panel 131 or near the touch panel 131 by using any proper object or accessory such as a finger or a stylus), and drive a corresponding connection apparatus based on a preset program. Optionally, the touch panel 131 may include two parts: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into coordinates of a touch point, and then sends the coordinates of the touch point to the processor 150. In addition, the touch controller can receive and execute a command sent by the processor 150. For example, the user taps a virtual button on the touch panel 131 by using a finger. The touch detection apparatus detects a signal brought by this tap, and then sends the signal to the touch controller. The touch controller further converts the signal into coordinates and sends the coordinates to the processor 150. The processor 150 performs operations such as video selection and editing based on the coordinates and a type (single tapping or double tapping) of the signal, and finally displays an editing result on a display panel 141.

The touch panel 131 may be implemented by using a plurality of types such as a resistive type, a capacitive type, an infrared type, and a surface acoustic wave type. In addition to the touch panel 131, the input device 130 may further include another input device 132. The another input device 132 may include but is not limited to one or more of a physical keyboard, a function key (such as a volume control key or an on/off key), a trackball, a mouse, a joystick, and the like.

The terminal 100 may further include the display device 140, and the display device 140 includes the display panel 141, configured to display information input by the user or information provided to the user, various menu interfaces of the terminal 100, and the like. In this embodiment, the display panel 141 is configured to display a result after video editing, and display information such as a video in this embodiment of this application. The display device 140 may include the display panel 141. Optionally, the display panel 141 may be configured in a form such as a liquid crystal display (LCD) or an organic light-emitting diode (OLED). In some other embodiments, the touch panel 131 may cover the display panel 141 to form a touch display screen.

In addition to the foregoing, the terminal 100 may further include a power supply 190 configured to supply power to another module, a camera 160 configured to photograph a photo or a video, a positioning module (such as a GPS) 161 that obtains a geographical location of the terminal, a gyroscope 162 that obtains a placing posture (such as an angle or a direction) of the terminal, and a timer 163 that records time. A video used in an editing process in this embodiment may be photographed by using the camera 160. The terminal 100 may further include one or more sensors 120 such as an acceleration sensor or an optical sensor. The terminal 100 may further include a radio frequency (RF) circuit 110, configured to perform network communication with a wireless network device, and may further include a Wi-Fi module 170, configured to perform Wi-Fi communication with another device.

Based on the described structure of the terminal 100 applied to this embodiment, components of an operating system that are related to an implementation location of the video special effect generation method provided in the embodiments are described below with reference to FIG. 2 by using an Android operating system as an example.

Figure 2:
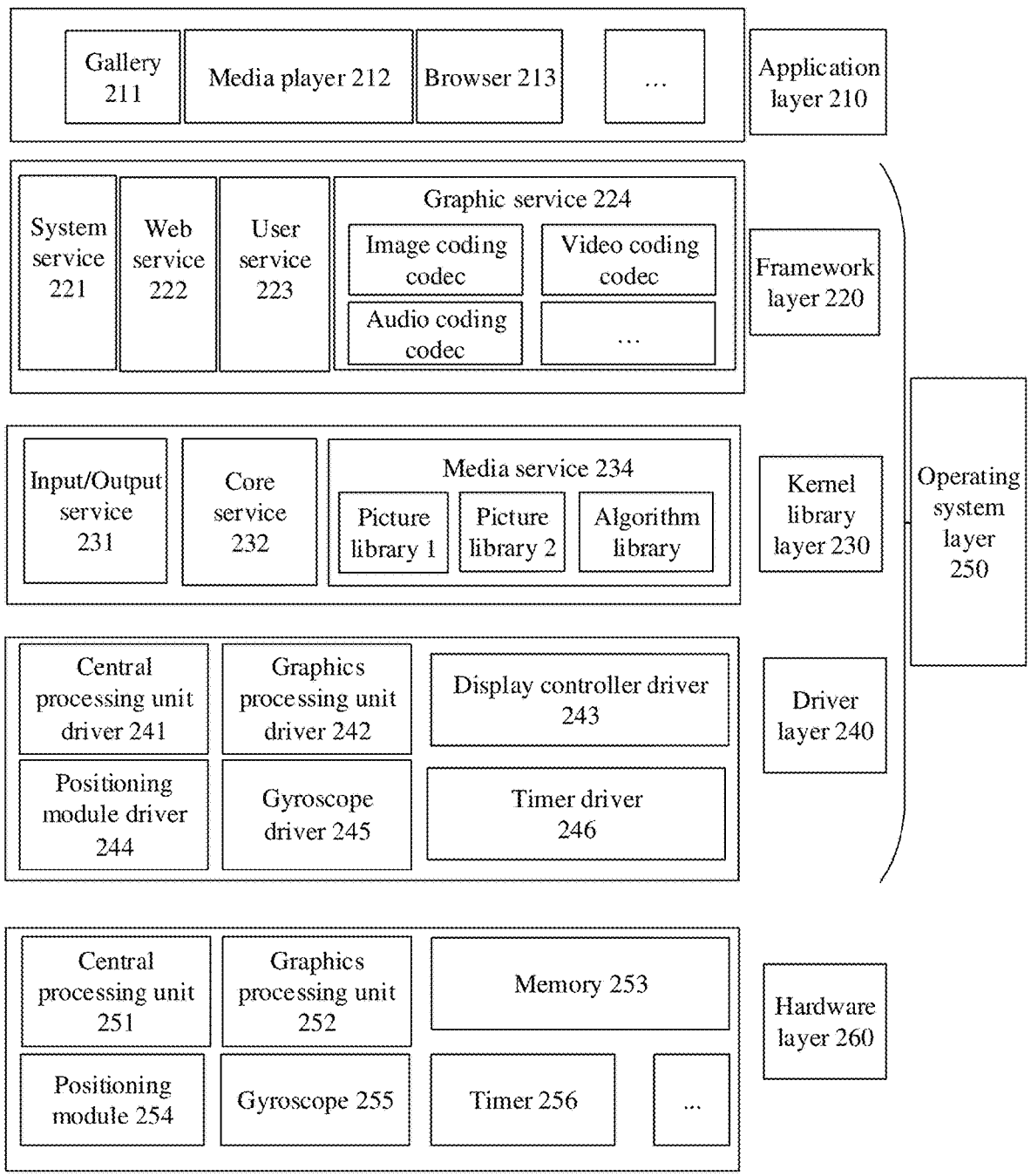
FIG. 2 is a schematic diagram of a structure of an operating system according to an embodiment.

FIG. 2 is a schematic diagram of a system structure of a terminal 200 according to an embodiment. The terminal 200 may be the device in the embodiments, for example, may be the terminal 100 shown in FIG. 1. The terminal 200 includes an application layer 210 and an operating system layer 250, and the operating system may be an Android operating system. The operating system layer 250 is further divided into a framework layer 220, a kernel library layer 230, and a driver layer 240. The operating system layer 250 in FIG. 2 may be considered as an implementation of the operating system 182 in FIG. 1, and the application layer 210 in FIG. 2 may be considered as an implementation of the application program 181 in FIG. 1. The driver layer 240 includes a CPU driver 241, a GPU driver 242, a display controller driver 243, a positioning module driver 244, a gyroscope driver 245, a timer driver 246, and the like. The kernel library layer 230 is a core part of the operating system, and includes an input/output service 231, a core service 232, a media service 234, and the like. The media service 234 includes a picture library 1 in a JPEG format, a picture library 2 in a PNG format, and a picture library in another format. The media service 234 further includes an algorithm library, and the algorithm library is used to store an algorithm related to video, for example, an algorithm for selecting a video segment, and an algorithm for determining a play speed of a corresponding video segment based on target information. The framework layer 220 may include a graphic service 224, a system service 221, a web service 222, a user service (Customer Service) 223, and the like. The graphic service 224 may include, for example, an image coding codec, a video coding codec, and an audio coding codec. The application layer 210 may include a graphics library 211, a media player 212, a browser 213, and the like.

In addition, under the driver layer 240, the terminal 200 further includes a hardware layer 260. A hardware layer of the computer system 200 may include a central processing unit (CPU) 251 and a graphics processing unit (GPU) 252 (equivalent to an implementation of the processor 150 in FIG. 1), and may further include a memory 253 (equivalent to the memory 180 in FIG. 1), including an internal memory and an external storage. The hardware layer may further include a positioning module 254 (equivalent to the positioning module 161 in FIG. 1) and a gyroscope 255 (equivalent to the gyroscope 162 in FIG. 1), and may further include a timer 256 (equivalent to the timer 163 in FIG. 1), and may further include one or more sensors (equivalent to the sensor 120 in FIG. 1). In addition, the hardware layer 260 may further include the power supply, the camera, the RF circuit, and the Wi-Fi module shown in FIG. 1, and may further include other hardware modules not shown in FIG. 1, for example, a memory controller and a display controller.

Figure 3:
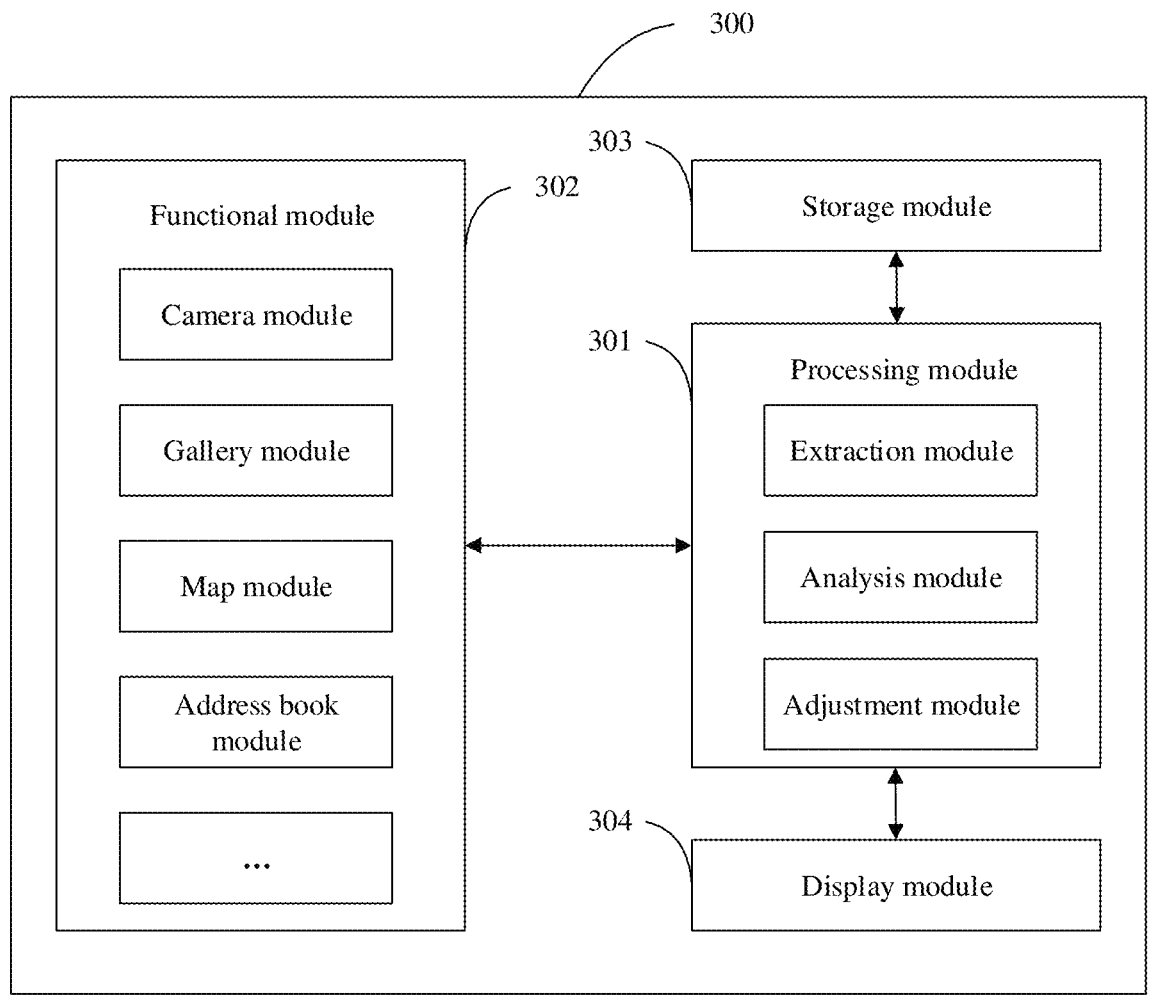
FIG. 3 is a schematic diagram of a logical structure of a terminal according to an embodiment.

FIG. 3 is a schematic diagram of an example of a structure of a terminal 300. Modules in the terminal are modules obtained through division based on a function. It can be understood that the modules are functional obtained through division based on the function. In implementation, some of the functional modules may be subdivided into more detailed functional modules, and some of the functional modules may be combined into one functional module. However, regardless of whether the functional modules are subdivided or combined, procedures performed by the terminal in a process of generating a special effect video from a video are approximately the same. Generally, each functional module corresponds to a computer program. When the computer programs corresponding to these functional modules are run on a processor, the functional modules are enabled to perform corresponding procedures to implement corresponding functions.

The terminal 300 includes a processing module 301, a functional module 302, a storage module 303 (which may correspond to the memory 180 in FIG. 1), and a display module 304 (which may correspond to the display device 140 in FIG. 1).

The processing module 301 includes an extraction module, an analysis module, and an adjustment module. The extraction module may be configured to perform an operation of obtaining target information in the video special effect generation method, and so on. The analysis module may be configured to perform an operation of determining a play speed based on the target information, and so on. The adjustment module may be configured to perform an operation of adjusting a play speed of a video, and so on.

The functional module 302 may include a camera module, a gallery module, a map module, an address book module, and the like. The camera module may be configured to perform an operation of photographing a picture or a video, for example, may be configured to perform an operation of photographing a target video in the video special effect generation method. The gallery module may be configured to perform an operation of managing and maintaining a picture and a video, for example, may be configured to perform an operation of managing and maintaining the target video in the video special effect generation method.

The storage module 303 may be configured to store a computer program, system data (for example, a configuration parameter of an operating system), and user data, for example, target information that is of a target video and that is obtained by the terminal (for example, information about a picture scenario in the target video, photographing duration, and other information). In addition, all photographed video data can be further considered as the user data.

The display module 304 may be configured to display a picture or a video on a display screen, for example, may play, on the display screen, a video whose play speed is adjusted in the video special effect generation method.

Optionally, the processor 150 shown in FIG. 1 may invoke the computer program stored in the memory 180 to implement a function of the processing module 301. The processor 150 shown in FIG. 1 may further invoke the computer program stored in the memory 180 to implement a function of the functional module 302.

Figure 4:
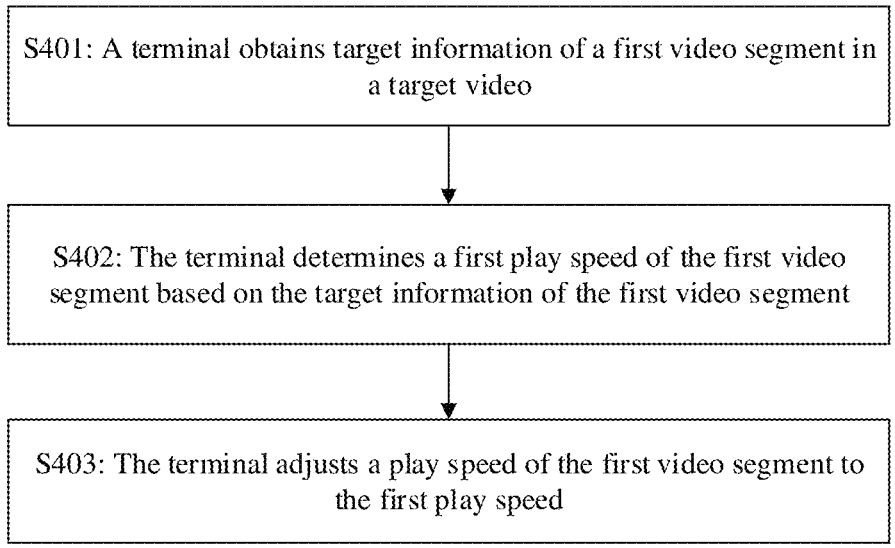
FIG. 4 is a schematic flowchart of a video special effect generation method according to an embodiment.

Referring to FIG. 4, a video special effect generation method provided in an embodiment is described below. The method may be implemented based on structures shown in FIG. 1, FIG. 2, and FIG. 3 or another structure. The method includes but is not limited to the following steps.

S401: A terminal obtains target information of a first video segment in a target video.

In an optional solution, the target information includes a content feature of the first video segment. In another optional solution, the target information includes a photographing parameter of the first video segment. In another optional solution, the target information includes the content feature of the first video segment and the photographing parameter of the first video segment. Optionally, in addition to the information enumerated above, the target information may further include other information, and the other information is not enumerated one by one herein.

The content feature of the first video segment may include one or more pieces of information such as information about a picture scenario in the first video segment, photographing duration of the first video segment, and a picture change in the first video segment. The photographing parameter of the first video segment may include one or more pieces of information such as a photographing focal length, a shutter speed, and an aperture of the first video segment.

The first video segment in this embodiment has many possible cases. For example, the target video includes only one video segment. In this case, the first video segment is the video segment. For another example, the target video includes a plurality of video segments, and the first video segment may be a video segment in the plurality of segments that meets a play speed adjustment condition. For another example, the target video includes a plurality of video segments, and the first video segment is any video segment in the plurality of segments. In other words, each of the plurality of video segments meets a play speed adjustment condition.

In addition, the target video may be a photographed video stored in the terminal, that is, the target video is not edited immediately after being photographed and may be first stored in a memory of the terminal. When the target video needs to be edited, the target video is obtained from the memory, and then corresponding target information is obtained based on the video. Alternatively, the target video may be a video that is being photographed by the terminal, that is, the target information of the first video segment in the target video is obtained in a process of photographing the target video.

A implementation process in which the terminal obtains the target information of the first video segment in the target video is described below.

In an embodiment, the terminal obtains the target video and extracts a photographing parameter of the target video, and then analyzes and processes the obtained target video and the extracted photographing parameter of the target video, to segment the target video and determine target information included in each video segment.

Four manners of determining a video segment in the target video and determining target information of the video segment are enumerated below.

Manner 1:

The terminal may obtain, in a time sequence, frames of images included in the target video frame-by-frame; recognize, by using an image recognition technology, picture content in the obtained frames of images; and then segment the target video based on a type to which the picture content belongs. A video including consecutive frames of images whose picture content belongs to a same type may be put in a video segment through segmentation, and a picture scenario in the video segment obtained through segmentation is a scenario corresponding to the picture content in the video segment. For example, it is assumed that picture content in the start 100 frames of images in the target video is a street view, and picture content in subsequent 200 frames of images is a snowflake falling in the sky. In this case, the terminal may divide the target video into two video segments based on a difference between the previous picture content and the subsequent picture content in the target video: a video segment including the start 100 frames of images and a video segment including the subsequent 200 frames of images. In this case, a picture scenario in the video segment including the start 100 frames of images is the street view, and a picture scenario in the video segment including the subsequent 200 frames of images is snowing.

Manner 2:

After recognizing the picture content in each frame of image in the target video, the terminal may analyze and compare the picture content in these frames of images to obtain a picture change speed of the target video or a video segment included in the target video.

A picture change speed of a video segment may have the following two cases.

In a first case, a picture change speed of a video segment falls within a first change speed range.

In a first possible implementation, the terminal may extract one frame of image at intervals of a first preset frame interval in a time sequence, and then successively compare picture content in extracted frames of images one by one. Picture content in a first extracted frame of image may be compared with picture content in a second extracted frame of image to obtain a first similarity, the picture content in the second extracted frame of image is compared with picture content in a third extracted frame of image to obtain a second similarity, and so on. In other words, picture content in an $i^{th}$ extracted frame of image is compared with picture content in an $(i+1)^{th}$ extracted frame of image to obtain an $i^{th}$ similarity, where i is an integer greater than or equal to 1 and less than a quantity of extracted frames of images. The first preset frame interval may be any integer frame interval between 0 frames and a quantity of frames of images included in the target video.

If in some or all of the foregoing similarities obtained through comparison, a proportion of similarities less than a first preset similarity is greater than or equal to a first preset proportion, it indicates that a scene in a video including consecutive frames of images before extracted frames of images corresponding to the some or all of the similarities changes continuously and apparently. This change may be referred to as a change whose picture change speed falls within the first change speed range. In this case, the terminal may put the video including the consecutive frames of images in a video segment through segmentation, and a picture change in the video segment is that a picture change speed falls within the first change speed range. The first preset proportion may be, for example, any proportion between 70% and 100%. The first preset similarity may be, for example, any similarity between 30% and 70%. A first preset proportion and a first preset similarity may be determined based on a scenario. This is not limited herein.

In a second possible implementation, the terminal may extract one frame of image at intervals of a first preset frame interval in a time sequence, and then successively compare picture content in extracted frames of images one by one. Picture content in a first extracted frame of image may be compared with picture content in a second extracted frame of image to obtain a first similarity, and the picture content in the second extracted frame of image is compared with picture content in a third extracted frame of image to obtain a second similarity. In other words, picture content in an $i^{th}$ extracted frame of image is compared with picture content in an $(i+1)^{th}$ extracted frame of image to obtain an $i^{th}$ similarity, where i is an integer greater than or equal to 1 and less than a quantity of extracted frames of images.

If in the obtained first similarity, second similarity, . . . , and the $i^{th}$ similarity, some similarities with consecutive numbers (for example, the first similarity, the second similarity, the third similarity, and the fourth similarity) change in a fluctuated manner, it indicates that a scene in a video including consecutive frames of images before extracted frames of images corresponding to the some similarities with consecutive numbers changes continuously and apparently. This change may be referred to as a change whose picture change speed falls within the first change speed range. In this case, the terminal may put the video including the consecutive frames of images in a video segment through segmentation, and a picture change in the video segment is that a picture change speed falls within the first change speed range. The consecutive frames of images each are any of one or more consecutive frames of images included in the target video, and the first preset frame interval may be any integer frame interval between 0 frames and a quantity of frames of images included in the target video.

Figure 5:
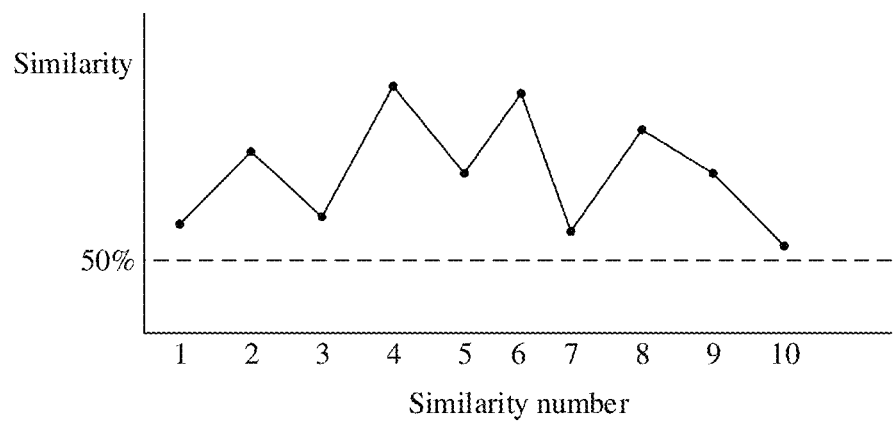
FIG. 5 is a schematic diagram of a picture content similarity fluctuation according to an embodiment.

For ease of understanding, an example is used below for description. It is assumed that the target video includes 100 frames of images. One frame of image is extracted from the 100 frames of images at intervals of one frame of image, and finally 50 frames of images are obtained through extraction. Then, picture content in a first extracted frame of image is compared with picture content in a second extracted frame of image to obtain a first similarity, the picture content in the second extracted frame of image is compared with picture content in a third extracted frame of image to obtain a second similarity, . . . . In other words, picture content in an $i^{th}$ extracted frame of image is compared with picture content in an $(i+1)^{th}$ extracted frame of image to obtain an $i^{th}$ similarity, where i is an integer greater than or equal to 1 and less than 50. It is found through analysis that ten similarities from the first similarity to the tenth similarity are in a fluctuated state. For example, FIG. 5 is a fluctuation diagram of the ten similarities. In FIG. 5, a vertical coordinate is a similarity, and a horizontal coordinate is a number of a similarity obtained by comparing, in a time sequent, picture content in an $i^{th}$ extracted frame of image with picture content in an $(i+1)^{th}$ extracted frame of image. For example, a similarity corresponding to a number 1 is the first similarity, and a similarity corresponding to a number 2 is the second similarity. It can be understood from FIG. 5 that these similarities are in a fluctuated state, which indicates that a scene in a video including consecutive frames of images, that is, the first consecutive 21 frames of images in the target video, that are before extracted frames of images corresponding to the ten similarities from the first similarity to the tenth similarity changes continuously and apparently. In other words, a picture change speed of the video including the first consecutive 22 frames of images falls within the first change speed range. In this case, the terminal may put the video including the consecutive 22 frames of images in a video segment through segmentation, and a picture change in the video segment is that a scene changes continuously and apparently. A scenario corresponding to the video including the consecutive 22 frames of images may be, for example, a martial art scenario.

In a second case, a picture change speed of a video segment falls within a second change speed range.

In a first possible implementation, the terminal may extract one frame of image at intervals of a first preset frame interval in a time sequence, and then successively compare picture content in extracted frames of images one by one. Picture content in a first extracted frame of image is compared with picture content in a second extracted frame of image to obtain a first similarity, the picture content in the second extracted frame of image is compared with picture content in a third extracted frame of image to obtain a second similarity, . . . . In other words, picture content in a $q^{th}$ extracted frame of image is compared with picture content in a $(q+1)^{th}$ extracted frame of image to obtain a $q^{th}$ similarity, where q is an integer greater than or equal to 1 and less than a quantity of extracted frames of images. The first preset frame interval may be any integer frame interval between 0 frames and a quantity of frames of images included in the target video.

If in some or all of the foregoing similarities obtained through comparison, a proportion of similarities greater than a second preset similarity is greater than or equal to a second preset proportion, it indicates that a scene in a video including consecutive frames of images before extracted frames of images corresponding to the some or all of the similarities changes slowly. This change may be referred to as a change whose picture change speed falls within the second change speed range. In this case, the terminal may put the video including the consecutive frames of images in a video segment through segmentation, and a picture change in the video segment is that a picture change speed falls within the second change speed range. The second preset proportion may be, for example, any proportion between 70% and 100%. The second preset similarity may be, for example, any similarity between 70% and 100%. A second preset proportion and a second preset similarity may be determined based on a scenario. This is not limited herein.

In a second possible implementation, the terminal may extract one frame of image at intervals of a second preset frame interval in a time sequence, and then successively compare picture content in extracted frames of images with picture content in a first extracted frame of image one by one. For example, picture content in a second extracted frame of image is compared with the picture content in the first extracted frame of image to obtain a first similarity, picture content in a third extracted frame of image is compared with the picture content in the first extracted frame of image to obtain a second similarity, and so on. In other words, picture content in a $j^{th}$ extracted frame of image is compared with the picture content in the first extracted frame of image to obtain a $j^{th}$ similarity, where j is an integer greater than or equal to 1 and less than or equal to a quantity of extracted frames of images.

If in the obtained first similarity, second similarity, . . . , and the $j^{th}$ similarity, some similarities with consecutive numbers (for example, the first similarity, the second similarity, the third similarity, and the fourth similarity) gradually become smaller, it indicates that a scene in a video including consecutive frames of images before extracted frames of images corresponding to the some similarities with consecutive numbers changes slowly. This change may be referred to as a change whose picture change speed falls within the second change speed range. In this case, the terminal may put the video including the consecutive frames of images in a video segment through segmentation, and a picture change in the video segment is that a picture change speed falls within the second change speed range. The consecutive frames of images each are any of one or more consecutive frames of images included in the target video.

Figure 6:
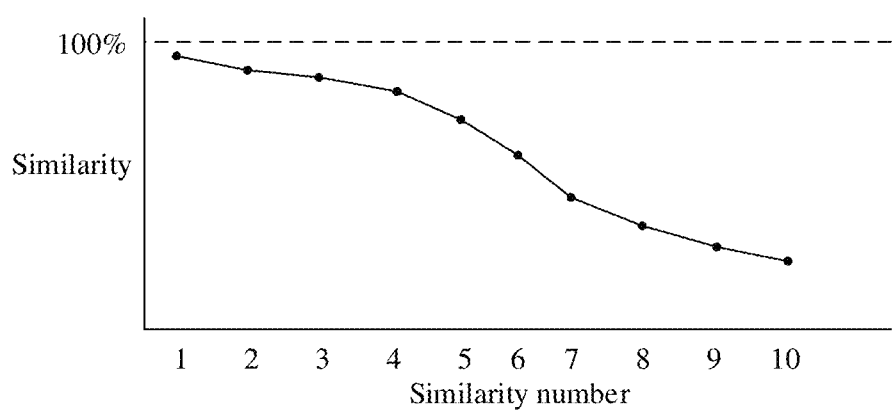
FIG. 6 is a schematic diagram of a picture content similarity trend according to an embodiment.

For ease of understanding, an example is used below for description. It is still assumed that the target video includes 100 frames of images. One frame of image is extracted from the 100 frames of images at intervals of one frame of image, and finally 50 frames of images are obtained through extraction. Then, picture content in a second extracted frame of image is compared with picture content in a first extracted frame of image to obtain a first similarity, picture content in a third extracted frame of image is compared with the picture content in the first extracted frame of image to obtain a second similarity, and so on. In other words, picture content in a $j^{th}$ extracted frame of image is compared with the picture content in the first extracted frame of image to obtain a $j^{th}$ similarity, where j is greater than or equal to 1 and less than or equal to 50. It is found through analysis that ten similarities from the first similarity to the tenth similarity are in a trend of gradually becoming smaller. For example, FIG. 6 is a trend diagram of the ten similarities. In FIG. 6, a vertical coordinate is a similarity, and a horizontal coordinate is a number of a similarity obtained by comparing, in a time sequent, picture content in an $i^{th}$ extracted frame of image with the picture content in the first extracted frame of image. For example, a similarity corresponding to a number 1 is the first similarity, and a similarity corresponding to a number 2 is the second similarity. It can be understood from FIG. 6 that these similarities are in a trend of gradually becoming smaller, which indicates that a scene in a video including consecutive frames of images, that is, the first consecutive 22 frames of images in the target video, that are before extracted frames of images corresponding to the ten similarities from the first similarity to the tenth similarity changes slowly. In other words, a picture change speed of the video including the first consecutive 22 frames of images falls within the second change speed range. In this case, the terminal may put the video including the consecutive 22 frames of images in a video segment through segmentation, and a picture change in the video segment is that a scene changes slowly. A scenario corresponding to the video including the consecutive 22 frames of images may be, for example, a scenario in which a flow gradually blooms or withers.

In this embodiment, any speed in the first change speed range is greater than any speed in the second change speed range.

Manner 3:

The terminal analyzes and processes the extracted photographing parameter of the target video to segment the target video and determines the target information included in each video segment.

The extracted photographing parameter of the target video may be a focal length used when the video is photographed. There may be one or more focal lengths. The terminal may divide the target video into one or more video segments based on different focal lengths. For example, a video including a video picture photographed by using a focal length of 1× or less than 1× may be put in a video segment through segmentation, and the target information of the video segment may be determined as that a used photographing focal length is a focal length of 1× or less than 1×. In addition, a video including a video picture photographed by using a focal length of 3× or greater than 3× may be put in a video segment through segmentation, and the target information of the video segment may be determined as that a used photographing focal length is a focal length of 3× or greater than 3×.

Manner 4:

The terminal divides the target video into one or more video segments, and a video segmentation manner may be the same as a segmentation manner in Manner 1, Manner 2, or Manner 3. After performing segmentation, the terminal separately analyzes the one or more video segments to obtain photographing duration, that is, video duration, corresponding to each of the one or more video segments. Alternatively, when segmenting the video, the terminal stores photographing duration of each video segment in a memory. When a video type or a play speed needs to be matched based on photographing duration information of the video segment, the terminal may obtain, from the memory, the photographing duration information corresponding to the video segment.

S402: The terminal determines a first play speed of the first video segment based on the target information of the first video segment.

A play speed of the first video segment may be obtained through matching from a preset special effect mapping relationship based on the target information. The special effect mapping relationship defines a correspondence between the target information and a plurality of play speeds. The first play speed is a play speed obtained through matching from the special effect mapping relationship based on the target information.

Table 1 is a table of a mapping relationship between a play speed and target information that is of the first video segment and that is obtained based on different cases. The following can be understood from Table 1.

For the target information that is of the first video segment and that is obtained in Manner 1 in Table 1, if the target information represents a scenario such as a dewdrop falling, a trickle, a waterfall, rain, snow, a butterfly dancing, or a bee gathering honey, a play speed corresponding to the first video segment is a slow motion play speed; or if the target information represents a scenario such as a bustling crowd, a wind and cloud change, a starry sky, or an aurora change, a play speed corresponding to the first video segment is a fast motion play speed.

The slow motion play speed may be a rate at which a quantity of played frames of images per unit time (for example, may be 1 second) is less than a first preset frame quantity. The fast motion play speed may be a rate at which a quantity of played frames of images per unit time (for example, may be 1 second) is greater than a second preset frame quantity. Optionally, the first preset frame quantity may be any frame quantity less than or equal to 24 frames, and the second preset frame quantity may be any frame quantity greater than or equal to 24 frames.

For the target information that is of the first video segment and that is obtained in Manner 2 in Table 1, if the target information represents that a picture change speed of the first video segment falls within the first change speed range, a play speed corresponding to the first video segment is a play speed corresponding to a slow motion; or if the target information represents that a picture change speed of the first video segment falls within the second change speed range, a play speed corresponding to the first video segment is a fast motion play speed.

For the target information that is of the first video segment and that is obtained in Manner 3 in Table 1, if the target information represents that a photographing focal length of the first video segment is greater than or equal to a 3× focal length, a play speed corresponding to the first video segment is a slow motion play speed; or if the target information represents that a photographing focal length of the first video segment is less than or equal to a 1× focal length, a play speed corresponding to the first video segment is a fast motion play speed.

For the target information that is of the first video segment and that is obtained in Manner 4 in Table 1, if the target information represents that photographing duration of the first video segment is less than 10 seconds, a play speed corresponding to the first video segment is a slow motion play speed; or if the target information represents that photographing duration of the first video segment is greater than 10 minutes, a play speed corresponding to the first video segment is a fast motion play speed.

TABLE 1

| Manner of determining the target information | Target information | Play speed |
|---|---|---|
| Manner 1 | A dewdrop falling, a trickle, a waterfall, rain, snow, a butterfly dancing, a bee gathering honey, and the like | Slow motion play speed |
|  | A bustling crowd, a wind and cloud change, a starry sky, an aurora change, and the like | Fast motion play speed |
| Manner 2 | A picture change speed falls within the first change speed range | Slow motion play speed |
|  | A picture change speed falls within the second change speed range | Fast motion play speed |
| Manner 3 | A photographing focal length is greater than or equal to a 3× focal length | Slow motion play speed |
|  | A photographing focal length is less than or equal to a 1× focal length | Fast motion play speed |
| Manner of determining the target information | Target information | Play speed |
| Manner 4 | Photographing duration of a video segment is less than 10 seconds (for example, a martial art or a flying bullet) | Slow motion play speed |
|  | Photographing duration of a video segment is greater than 10 minutes (for example, a butterfly emerging from a chrysalis or a flower blooming) | Fast motion play speed |

Also, the target information may be input to a machine learning model based on a machine learning principle, and the machine learning model outputs the first play speed corresponding to the target information.

Alternatively, the first play speed may be obtained through calculation by using a mathematical model. Input of the model is one or more types of target information of the first video segment, and output of the model is the first play speed.

For example, if information input to the mathematical model or the machine learning model is information representing a scenario such as a dewdrop falling, a trickle, a waterfall, rain, snow, a butterfly dancing, or a bee gathering honey, a corresponding play speed that is output by the mathematical model or the machine learning model to match the information is the slow motion play speed. Alternatively, if information input to the mathematical model or the machine learning model is information representing a scenario such as a bustling crowd, a wind and cloud change, a starry sky, or an aurora change, a corresponding play speed that is output by the mathematical model or the machine learning model to match the information is the fast motion play speed.

For example, if information input to the mathematical model or the machine learning model is information representing that the picture change speed of the first video segment falls with the first change speed range, a corresponding play speed that is output by the mathematical model or the machine learning model to match the information is the slow motion play speed. Alternatively, if information input to the mathematical model or the machine learning model is information representing that the picture change speed of the first video segment falls with the second change speed range, a corresponding play speed that is output by the mathematical model or the machine learning model to match the information is the fast motion play speed.

For example, if information input to the mathematical model or the machine learning model is information representing that the photographing focal length of the first video segment is greater than or equal to a 3× focal length, a corresponding play speed that is output by the mathematical model or the machine learning model to match the information is the slow motion play speed. Alternatively, if information input to the mathematical model or the machine learning model is information representing that the photographing focal length of the first video segment is less than or equal to a 1× focal length, a corresponding play speed that is output by the mathematical model or the machine learning model to match the information is the fast motion play speed.

For example, if information input to the mathematical model or the machine learning model is information representing that the photographing duration of the first video segment is less than 10 seconds, a corresponding play speed that is output by the mathematical model or the machine learning model to match the information is the slow motion play speed. Alternatively, if information input to the mathematical model or the machine learning model is information representing that the photographing duration of the first video segment is greater than 10 minutes, a corresponding play speed that is output by the mathematical model or the machine learning model to match the information is the fast motion play speed.

In a possible implementation, in addition to the manner correspondingly described in Table 1 and the manner using the mathematical model or the machine learning model, the terminal may determine the first play speed of the first video segment based on the target information of the first video segment in the following manner.

The terminal determines a first video type of the first video segment based on the target information of the first video segment, and then obtain, through matching from the preset special effect mapping relationship, the first play speed corresponding to the first video type of the first video segment. The special effect mapping relationship defines the correspondence between each of a plurality of video types and each of a plurality of play speeds.

In an embodiment, after obtaining the target information of the first video segment in step 401, the terminal may determine a video type of the first video segment based on the target information. For example, the terminal may mark a corresponding video type based on a feature corresponding to the target information, and then obtain a corresponding play speed through matching from the special effect mapping relationship based on the video type. The special effect mapping relationship defines the correspondence between each of a plurality of video types and each of a plurality of play speeds. The first video type is a corresponding video type determined based on the target information of the first video segment. Table 2 is a table of a mapping relationship between a play speed and a video type that is determined based on different target information. The following can be understood from Table 2.

If the target information represents a scenario such as dewdrop falling, a trickle, or a waterfall, a video type that is of the first video segment and that is determined based on the target information is running water, and the first play speed obtained through matching from Table 2 based on the video type (that is, the running water) is the slow motion play speed.

If the target information represents a scenario such as raining or snowing, a video type that is of the first video segment and that is determined based on the target information is rainy/snowy weather, and the first play speed obtained through matching from Table 2 based on the video type (that is, the rainy/snowy weather) is the slow motion play speed.

If the target information represents a scenario such as a butterfly dancing or a bee gathering honey, a video type that is of the first video segment and that is determined based on the target information is a close-up of an animal, and the first play speed obtained through matching from Table 2 based on the video type (that is, the close-up of an animal) is the slow motion play speed.

If the target information represents a scenario such as a bustling crowd or the like, a video type that is of the first video segment and that is determined based on the target information is a street, and the first play speed obtained through matching from Table 2 based on the video type (that is, the street) is the fast motion play speed.

If the target information represents a scenario such as a wind and cloud change, a starry sky, or an aurora change, a video type that is of the first video segment and that is determined based on the target information is a natural scene, and the first play speed obtained through matching from Table 2 based on the video type (that is, the natural scene) is the fast motion play speed.

If the target information represents that the picture change speed of the first video segment falls within the first change speed range, a video type that is of the first video segment and that is determined based on the target information is a fast picture content change, and the first play speed obtained through matching from Table 2 based on the video type (that is, the fast picture content change) is the slow motion play speed.

TABLE 2

| Target information | Video type | Play speed |
| --- | --- | --- |
| A dewdrop falling, a trickle, a waterfall, and the like | Running water | Slow motion play speed |
| Rain, snow, and the like | Rainy and snowy weather | |
| A butterfly dancing, a bee gathering honey, and the like | Close-up of an animal | |
| A bustling crowd and the like | Street | Fast motion play speed |
| A wind and cloud change, a starry sky, an aurora change, and the like | Natural scene | |
| A picture change speed falls within the first change speed range | Fast picture content change | Slow motion play speed |
| A picture change speed falls within the second change speed range | Slow picture content change | Fast motion play speed |
| A photographing focal length is greater than or equal to a 3x focal length | Short focus close-up | Slow motion play speed |
| A photographing focal length is less than or equal to a 1x focal length | Long focus or wide angle | Fast motion play speed |
| Photographing duration of a video segment is less than 10 seconds (for example, a martial art or a flying bullet) | Short photographing duration | Slow motion play speed |
| Photographing duration of a video segment is greater than 10 minutes (for example, a butterfly emerging from a chrysalis or a flower blooming) | Long photographing duration | Fast motion play speed |

If the target information represents that the picture change speed of the first video segment falls within the second change speed range, a video type that is of the first video segment and that is determined based on the target information is a slow picture content change, and the first play speed obtained through matching from Table 2 based on the video type (that is, the slow picture content change) is the fast motion play speed.

If the target information represents a case in which the photographing focal length of the first video segment is greater than or equal to a 3× focal length, a video type that is of the first video segment and that is determined based on the target information is a short focus close-up, and the first play speed obtained through matching from Table 2 based on the video type (that is, the short focus close-up) is the slow motion play speed.

If the target information represents a case in which the photographing focal length of the first video segment is less than or equal to a 1× focal length, a video type that is of the first video segment and that is determined based on the target information is a long focus or a wide angle, and the first play speed obtained through matching from Table 2 based on the video type (the long focus or the wide angle) is the fast motion play speed.

If the target information represents a case in which the photographing duration of the first video segment is less than 10 seconds, a video type that is of the first video segment and that is determined based on the target information is short photographing duration, and the first play speed obtained through matching from Table 2 based on the video type (that is, the short photographing duration) is the slow motion play speed.

If the target information represents a case in which the photographing duration of the first video segment is greater than 10 minutes, a video type that is of the first video segment and that is determined based on the target information is long photographing duration, and the first play speed obtained through matching from Table 2 based on the video type (that is, the long photographing duration) is the fast motion play speed.

S403: The terminal adjusts a play speed of the first video segment to the first play speed.

After determining the target information or the type of the first video segment, the terminal obtains a corresponding play speed through matching from the special effect mapping relationship based on the target information or the type, and then adjusts the play speed of the first video segment to the corresponding play speed. Subsequently, the terminal can play the video segment at the adjusted play speed. For example, a play speed of a segment of video before adjustment is 24 frames of images per second, and an adjusted play speed is 48 frames of images per second, that is, a play speed of the video segment is accelerated to twice as fast as an original play speed. In this way, when a user needs to play the video segment, the terminal may play the video segment at the play speed of 48 frames of images per second.

In conclusion, compared with a conventional technology in which a play speed of a video needs to be manually edited, which imposes a strict requirement on an artistic skill and an editing capability, in this embodiment, a user does not need to have the artistic skill and the editing capability. A device automatically determines a play speed of a photographed video based on content in the video (for example, a scenario presented in the video) or some parameters (for example, a focal length) used when the video is photographed, and then intelligently adjusts the play speed of the video, so as to simply and quickly obtain a video work with rich rhythms and a high sharing value. Therefore, editing efficiency is greatly improved, and this embodiment is applicable to more users.

In a possible implementation, the determining a first play speed of the first video segment based on the target information of the first video segment includes: when the first video segment is a video type whose photographing focal length falls within a first focal length range, determining that the first play speed is the slow motion play speed; and when the first video segment is a video type whose photographing focal length falls within a second focal length range, determining that the first play speed is the fast motion play speed. Any focal length in the first focal length range is greater than any focal length in the second focal length range.

The first focal length range may be, for example, greater than or equal to a 3× focal length, and the second focal length range may be, for example, less than or equal to a 1× focal length. A focal length range may be determined based on a case. This is not limited herein. For implementation of this embodiment, refer to the description corresponding to Table 2. Details are not described herein again.

In a possible implementation, the determining a first play speed of the first video segment based on the target information of the first video segment includes: when the first video segment is a video type whose photographing duration falls within a first preset duration range, determining that the first play speed is the slow motion play speed; and when the first video segment is a video type whose photographing duration falls within a second preset duration range, determining that the first play speed is the fast motion play speed. Any duration in the first preset duration range is less than any duration in the second preset duration range.

The first preset duration range may be, for example, photographing duration of a video segment is less than 10 seconds, and the second preset duration range may be, for example, photographing duration of a video segment is greater than 10 minutes. A preset duration range may be determined based on a case. This is not limited herein. For implementation of this embodiment, refer to the description corresponding to Table 2. Details are not described herein again.

In a possible implementation, the target information of the first video segment includes at least two types of information in the following information: information about a picture scenario in the first video segment, a photographing focal length of the first video segment, photographing duration of the first video segment, and a picture change in the first video segment. The determining a first play speed of the first video segment based on the target information of the first video segment includes: determining at least two play speed results of the first video segment based on the at least two types of information, where each play speed result is determined based on one of the at least two types of information; and determining the first play speed of the first video segment based on the at least two play speed results.

In an embodiment, after obtaining at least two types of information in the following four types of information: the information about the picture scenario in the first video segment, the photographing focal length of the first video segment, the photographing duration of the first video segment, and the picture change in the first video segment, the terminal determines one play speed result of the first video segment based on each type of information, that is, the terminal may determine at least two play speed results of the first video segment. Then, the terminal comprehensively analyzes the at least two play speed results to determine a play speed corresponding to one play speed result as the first play speed of the first video segment.

In a possible implementation, the first play speed is a play speed that appears a maximum quantity of times in play speeds represented by the at least two play speed results.

For ease of understanding of this embodiment, an example is used below for description.

For example, it is assumed that the terminal obtains the following two types of information: the information about the picture scenario in the first video segment and the photographing focal length of the first video segment. Assuming that the obtained information about the picture scenario represents a scenario of a trickle, a play speed that can be obtained through matching from Table 1 or Table 2 based on the scenario is the slow motion play speed. Assuming that the obtained photographing focal length is greater than or equal to a 3× focal length, a play speed that can be obtained through matching from Table 1 or Table 2 based on the information is the slow motion play speed. Because the play speeds determined based on the two types of information each are a slow motion play speed, it can be determined through comprehensive analysis that the first play speed of the first video segment is the slow motion play speed.

For example, it is assumed that the terminal obtains the following three types of information: the photographing focal length of the first video segment, the photographing duration of the first video segment, and the picture change in the first video segment. Assuming that the obtained photographing focal length of the first video segment is greater than or equal to a 3× focal length, a play speed that can be obtained through matching from Table 1 or Table 2 based on the information is the slow motion play speed. Assuming that the obtained photographing duration of the first video segment represents a case in which the photographing duration of the first video segment is greater than 10 minutes, a play speed that can be obtained through matching from Table 1 or Table 2 based on the information is the fast motion play speed. Assuming that the obtained picture change in the first video segment represents a case in which a scene in the first video segment changes slowly, a play speed that can be obtained through matching from Table 1 or Table 2 based on the information is the fast motion play speed. Through comprehensive analysis, in the play speed results respectively determined based on the three types of information, two results represent a fast motion play speed, and only one result represents a slow motion play speed. In this case, it can be finally determined that the first play speed of the first video segment is the fast motion play speed.

The foregoing example is merely an example for description, and another possible embodiment further exists. This is not limited herein.

In a possible implementation, the video special effect generation method further includes: obtaining target information of a second video segment in the target video, where the target information includes one or more of a content feature of the second video segment and a photographing parameter of the second video segment; determining a second play speed of the second video segment based on the target information of the second video segment; and adjusting a play speed of the second video segment to the second play speed.

In an embodiment, the target video may include a plurality of video segments. The terminal may determine, based on obtained target information of each video segment, a play speed corresponding to the video segment to correspondingly adjust the play speed of the video segment. For implementation of this embodiment, refer to the corresponding description in the method in FIG. 3 and a possible implemented implementation of the method. Details are not described herein again. This embodiment indicates that play speeds of a plurality of video segments included in a video may be separately adjusted, which helps further enrich a play rhythm of the video.

That the foregoing terminal is a mobile phone is as an example to describe a schematic diagram of a user interface (UI) of the mobile phone in a processing of implementing a special effect for a video by using the foregoing method, to facilitate better understanding of the solutions in the embodiments.

The term "user interface" in the embodiments is a medium interface for interaction and information exchange between an application or an operating system and a user and implements conversion between an internal form of information and a form that can be accepted by the user. The user interface is usually represented in a form of a graphical user interface (GUI), which is a user interface that is related to a computer operation and that is displayed in a graphical manner. The user interface may be an interface element such as an icon, a window, or a control displayed in a display of an electronic device. The control may include a visible interface element such as an icon, a button, a menu, a tab, a text box, a dialog box, a status bar, a navigation bar, or a widget.

Figure 7:
FIG. 7 to FIG. 16 are schematic diagrams of terminal user interfaces of a video special effect generation method according to the embodiments.

FIG. 7 shows an example user interface 71 that is on a mobile phone and that is used to display an application program installed on the mobile phone.

The user interface 71 may include a status bar 701, a calendar indicator 702, a weather indicator 703, a tray 704 having an icon of a commonly used application program, a navigation bar 705, a location information indicator 706, and another application program icon.

The status bar 701 may include an operator name (for example, "China Mobile") 701A, one or more signal strength indicators 701B of a wireless fidelity (Wi-Fi) signal, one or more signal strength indicators 701C of a mobile communications signal (also referred to as a cellular signal), a battery status indicator 701D, and a time indicator 701E.

The calendar indicator 702 may be used to indicate a current time, for example, a date, a day of the week, hour-minute information, and the like.

The weather indicator 703 may be used to indicate a weather type such as cloudy to clear or light rain and may be further used to indicate information such as a temperature.

The tray 704 having the icon of a commonly used application program may display a phone icon 704A, an address book icon 704B, a short message icon 704C, and a camera icon 704D.

The navigation bar 705 may include system navigation buttons such as a back button 705A, a home screen button 705B, and a multi-task button 705C. When it is detected that a user taps the back button 705A, the mobile phone may display a previous page of a current page. When it is detected that the user taps the home screen button 705B, the mobile phone may display a main interface. When it is detected that the user taps the multi-task button 705C, the mobile phone may display a task recently opened by the user. The navigation buttons may alternatively have other names. This is not limited. In addition to a virtual button, each navigation button in the navigation bar 705 may alternatively be implemented as a physical button.

The location information indicator 706 may be used to indicate information such as a currently located city and/or a currently located region in a city.

The another application program icon may be, for example, a mailbox icon 707, a phone manager icon 708, a settings icon 709, a gallery icon 710, or the like.

The user interface 41 may further include a page indicator 711. The other application icons may be distributed on a plurality of pages, and the page indicator 711 may be used to indicate a page on which an application is currently browsed by the user. The user may slide leftward or rightward in an area including the other application icons, to browse an application icon on another page.

In some embodiments, the example of the user interface 71 shown in FIG. 7 may be a home screen of the mobile phone.

In some other embodiments, the mobile phone may further include an entity home screen button. The home screen button may be used to receive an instruction of the user to return a currently displayed UI to the home screen, so that the user can conveniently view the home screen at any time. The instruction may be an operation instruction of pressing/ touching the home button once by the user, may be an operation instruction of consecutively pressing the home button twice by the user within a short time period, or may be an operation instruction of long pressing the home button by the user for a predetermined time period. In some other embodiments, a fingerprint sensor may be further integrated into the home button, to collect and recognize a fingerprint when the home button is pressed.

It can be understood that FIG. 7 shows only an example of the user interface on the mobile phone and should not constitute a limitation on this embodiment.

In response to a tap or touch operation on the camera icon 704D in the user interface 71, the user interface of the mobile phone displays a user interface of photographing. Then, in the user interface, the mobile phone may enter a recording mode in response to a tap or touch operation on a recording control. A user interface in the recording mode may be shown in FIG. 8.

Figure 8:
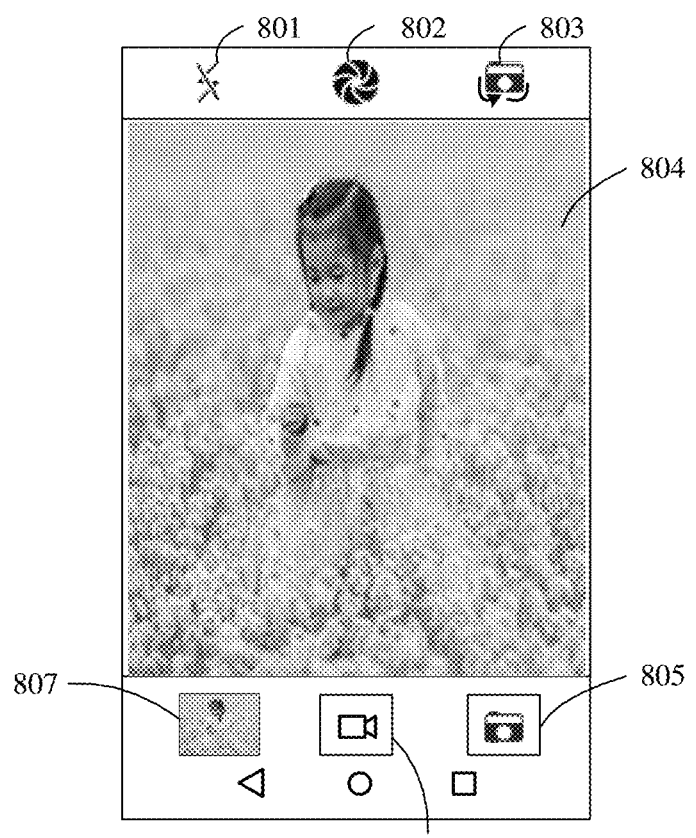

The user interface in FIG. 8 includes a flash control 801, an aperture control 802, a front-facing/rear-facing camera conversion control 803, a recorded picture 804, a camera control 805, a recording control 806, and a gallery control 807.

The flash control 801 may be configured to control enabling and disabling of a flash.

The aperture control 802 may be configured to control enabling and disabling of an aperture.

The front-facing/rear-facing camera conversion control 803 may be configured to adjust whether a camera for photographing or recording is a front-facing camera or a rear-facing camera.

The recorded picture 804 may be configured to display picture content immediately photographed by a camera.

The camera control 805 may be configured to convert a camera into a photographing mode when the camera is in a recording mode and is further configured to: when the camera is in the photographing mode, enable the camera to perform photographing.

The recording control 806 may be configured to convert a camera into a recording mode when the camera is in a photographing mode and is further configured to: when the camera is in the recording mode, enable the camera to perform recording and stop photographing performed by the camera.

The gallery control 807 may be configured to view a photographed photo and a recorded video.

In the user interface shown in FIG. 8, the mobile phone enables a camera to perform recording in response to a tap or touch operation on the recording control 806.

Then, in a recording process, the mobile phone stops the recording operation in response again to a tap or touch operation on the recording control 806, so as to complete recording of a video.

Figure 9:
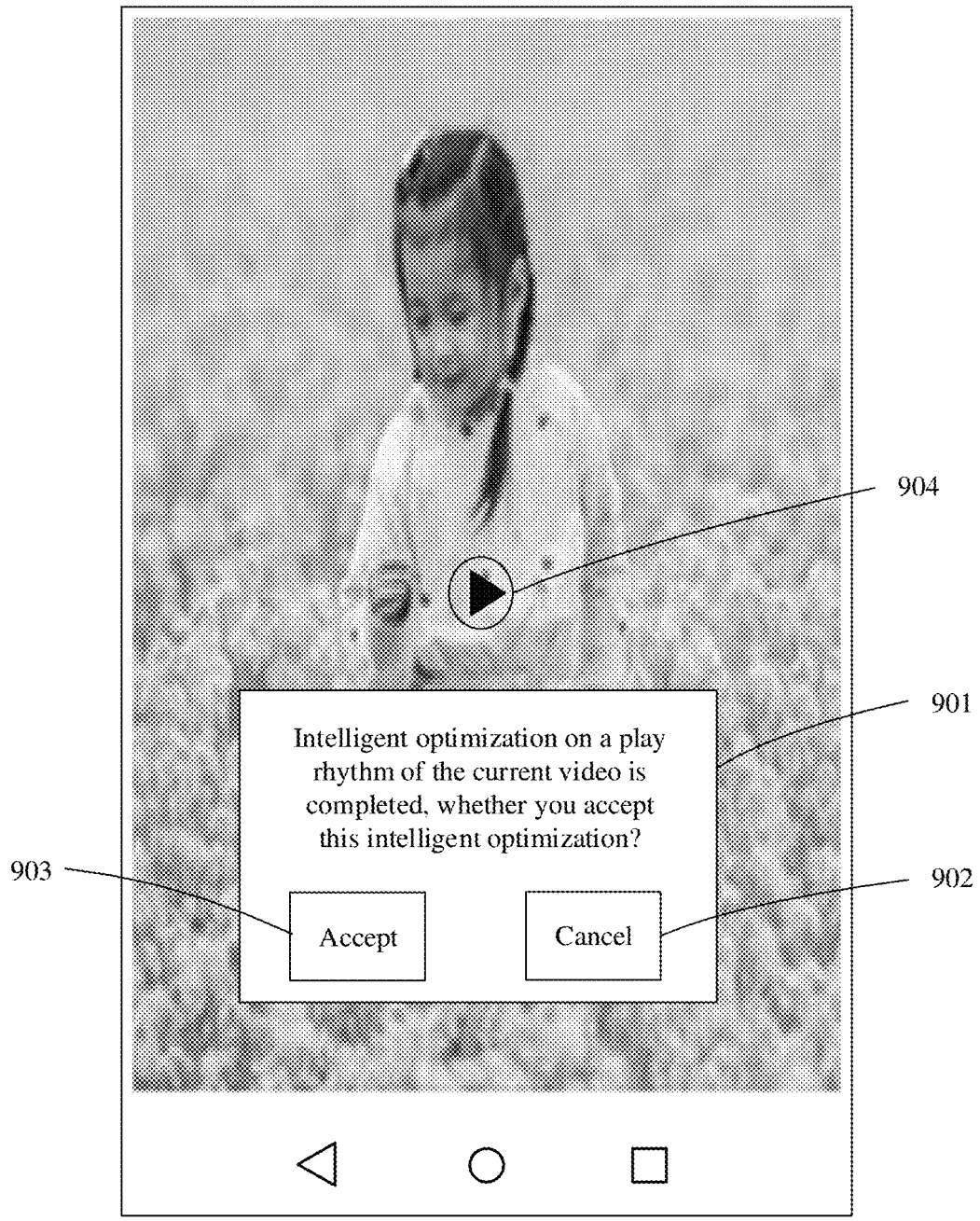

After recording of a video is completed, the user interface of the mobile phone may display a user interface shown in FIG. 9. The user interface shown in FIG. 9 includes a small prompt window 901. The small prompt window 901 is configured to prompt that the mobile phone completes intelligent optimization on a play rhythm of the recorded video, and query whether the user accepts a result of the intelligent optimization. In addition, the small window 901 further includes an accept button 903 and a cancel button 902.

In response to a tap or touch operation on the accept button 903, the mobile phone may store an intelligent adjusted video, and may further store the video before the intelligent optimization. In response to a tap or touch operation on the cancel button 902, the mobile phone may cancel the result of the current intelligent optimization, and store only the recorded original video.

The user interface shown in FIG. 9 further includes a play control 904, and the mobile phone may play the intelligently optimized video in response to a tap or touch operation on the play control.

Another embodiment of implementation of a user interface for adjusting a video play speed is described below.

Figure 10:
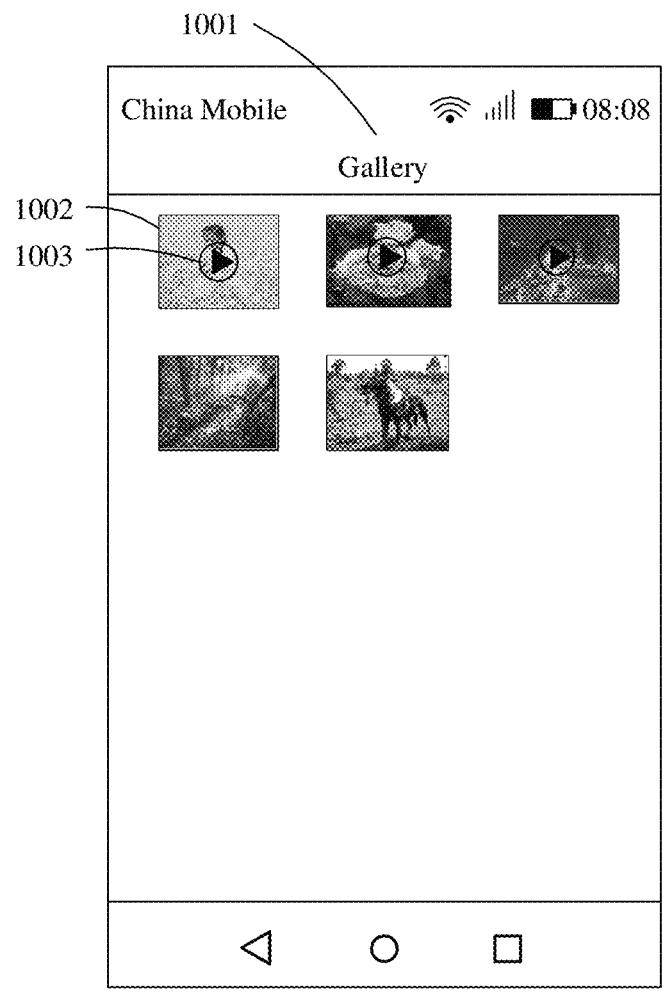

FIG. 10 may be a user interface diagram displayed after the mobile phone responds to a tap or touch operation on the gallery icon 710 in the interface shown in FIG. 7. The user interface diagram includes a theme name 1001. The theme name may be, for example, a gallery. The gallery may include a video thumbnail and a picture thumbnail. The video thumbnail further includes a play control 1003, configured to mark the thumbnail as a video thumbnail. However, the picture thumbnail has no play control. In response to a tap or touch operation on these thumbnails, the mobile phone may display, on a display screen, a picture of a real size or a play interface of a video.

Figure 11:
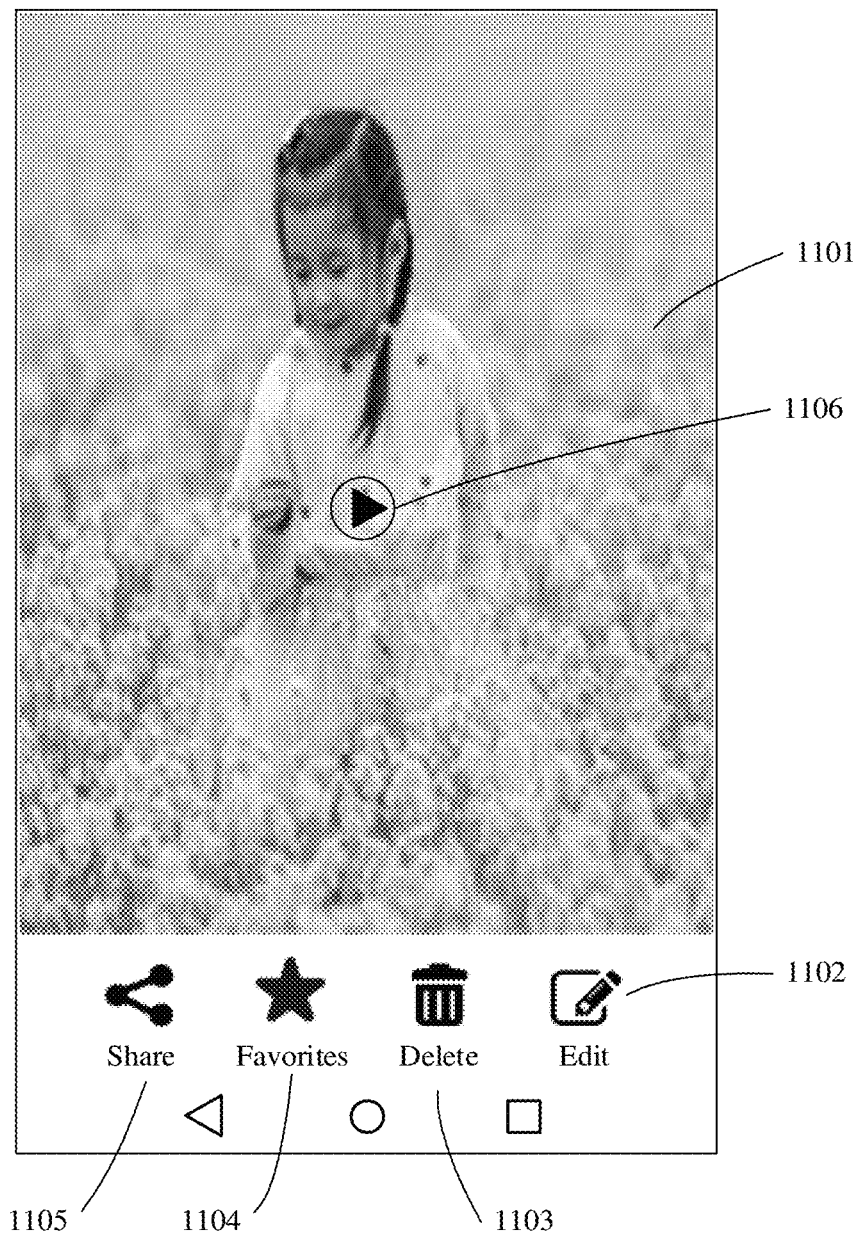

For example, in response to a tap or touch operation on a video thumbnail 1002, the mobile phone may display a play interface of the video on the display screen, as shown in FIG. 11. In the interface shown in FIG. 11, the mobile phone may play the video in response to a tap or touch operation on a play control 1106.

In addition, the interface shown in FIG. 11 may further include an editing control 1102, a deletion control 1103, a favorites control 1104, and a sharing control 1105. The editing control 1102 may be configured to edit a video displayed in the interface, the deletion control 1103 may be configured to delete a video displayed in the interface, the favorites control 1104 may be configured to collect a video displayed in the interface, and the sharing control 1105 may be configured to share a video displayed in the interface.

Figure 12:
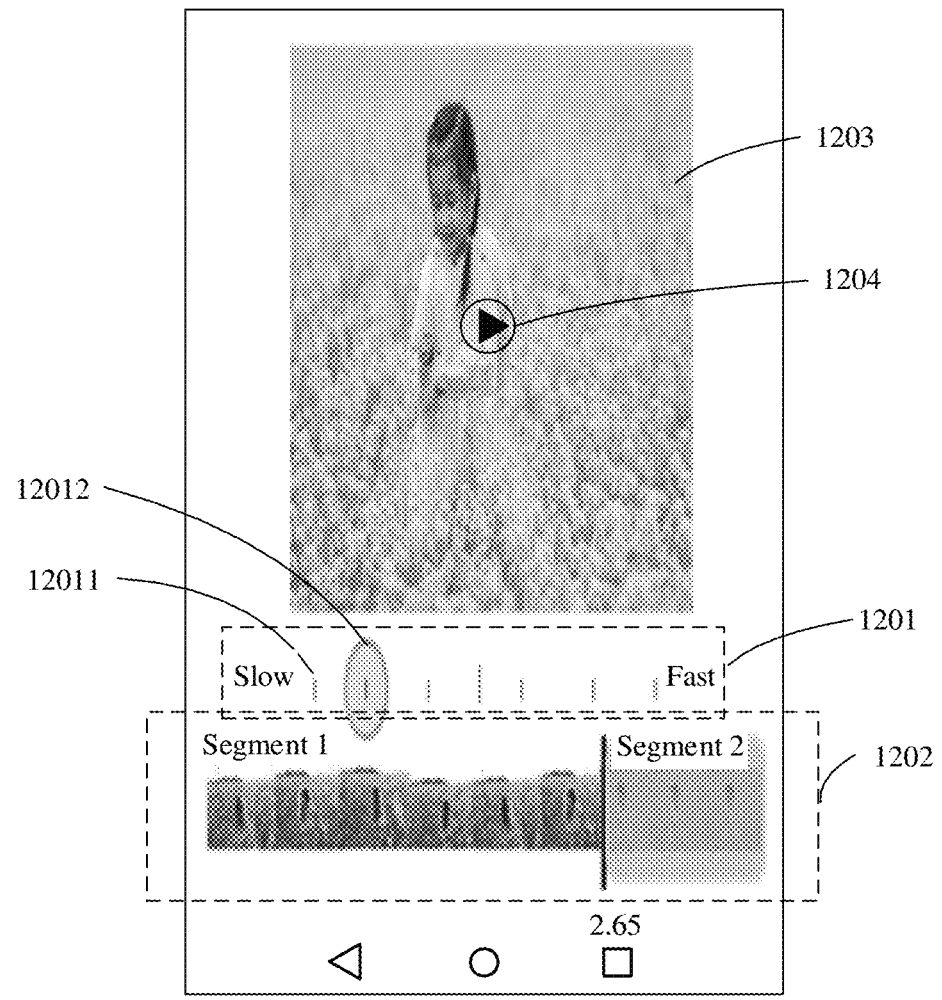

In response to a tap or touch operation on the editing control 1102, the mobile phone may display a video editing interface, such as an interface shown in FIG. 12, on the display screen.

The interface shown in FIG. 12 includes a video play speed bar 1201. The video play speed bar 1201 includes a plurality of play speed adjustment points 12011, each adjustment point corresponds to a play speed, and these adjustment points gradually increase a play speed from a slow play speed to a fast play speed.

The interface shown in FIG. 12 further includes a video segment selection area 1202 for a video segment that is obtained through intelligent segmentation based on the corresponding method in the foregoing method embodiment of the video special effect generation method. It can be understood from the video segment selection area 1202 that the mobile phone divides a video into two video segments, which are respectively a segment 1 and a segment 2. Further, in an embodiment, a video may be divided into one or more video segments to be displayed in the video segment frame selection area 1202. Video segment division may be determined based on a case. This is not limited in this embodiment.

In the interface shown in FIG. 12, the mobile phone has intelligently adjusted play speeds of the two video segments in the video segment selection area 1202. Referring to FIG. 12, the segment 2 in the video segment selection area 1202 is selected, and the video play speed bar 1201 correspondingly marks and displays an intelligently adjusted play speed 12012 of the segment 2. Additionally, in response to a tap or touch operation on the segment 1 in the video segment selection area 1202, the mobile phone also marks and displays an intelligently adjusted play speed of the segment 1 on the display screen.

In addition, the interface shown in FIG. 12 further includes a video preview area 1203. In response to a tap or touch operation on a play control 1204, the mobile phone may play a selected video segment in the video preview area 1203 based on a play speed selected in the video play speed bar 1201. Also, in response to a tap or touch operation on the play control 1204, the mobile phone may play, in the video preview area 1203, a complete video obtained after intelligent optimization.

Figure 13:
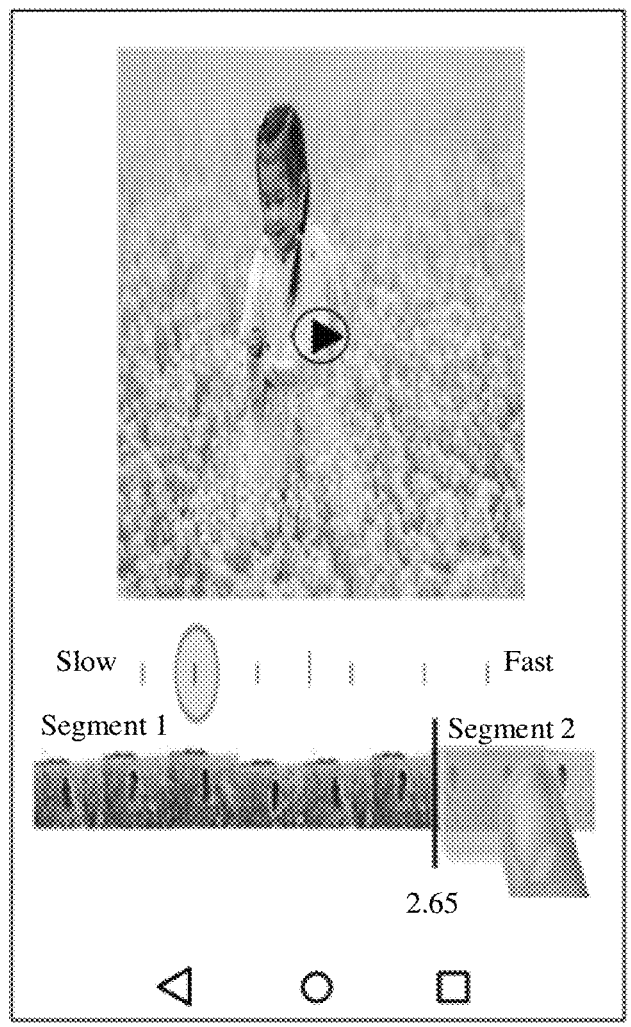

Additionally, in the interface shown in FIG. 12, a user may alternatively manually select a corresponding video segment. After the user selects the video segment, the video play speed bar 1201 correspondingly displays an intelligently optimized play speed. The user may alternatively manually adjust the video play speed bar 1201 to adjust a play speed of the selected video segment. For example, reference may be made to FIG. 13 and FIG. 14. In FIG. 13, the user may manually select a video segment in the video segment selection area 1202. After the video segment is selected, it can be seen that the video play speed bar 1201 correspondingly displays an intelligently optimized play speed. Then, referring to FIG. 14, the user may alternatively select a play speed on the video play speed bar 1201 as a play speed of the selected video segment.

Figure 15:
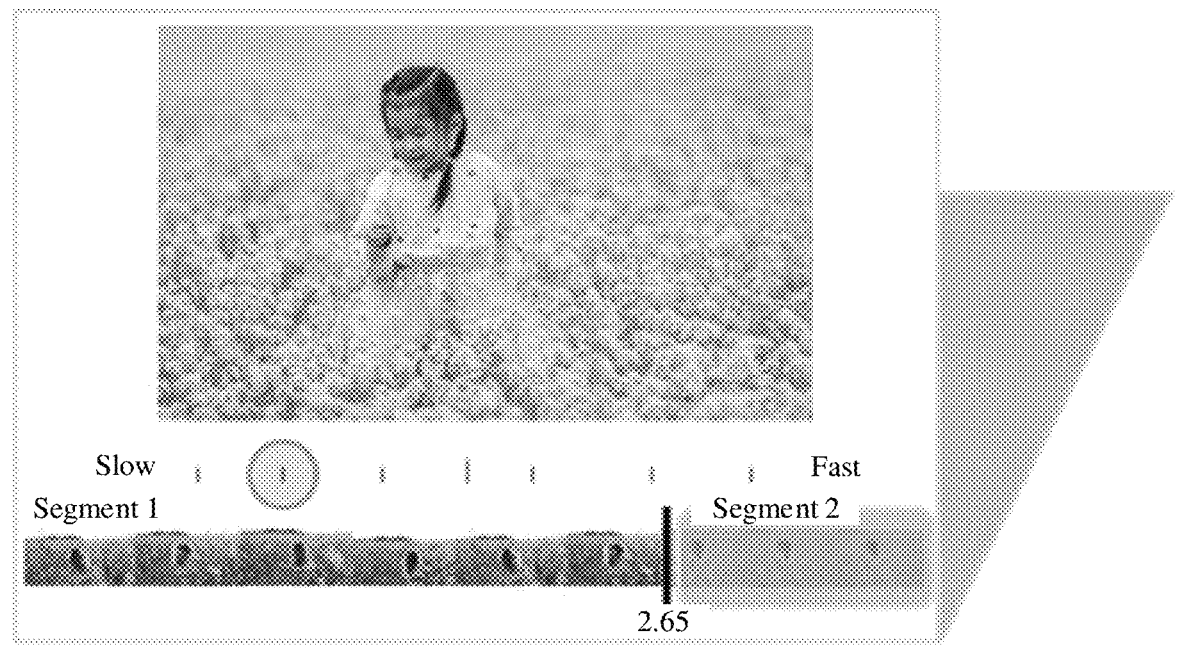

In a possible implementation, this embodiment may be further applied to mobile phone with a foldable screen. For example, FIG. 15 is a user interface for performing video editing on a folded foldable screen, and an editing mode effect before a display screen of the mobile phone with a foldable screen is unfolded is the same as an editing mode effect of a common mobile phone.

Figure 16:
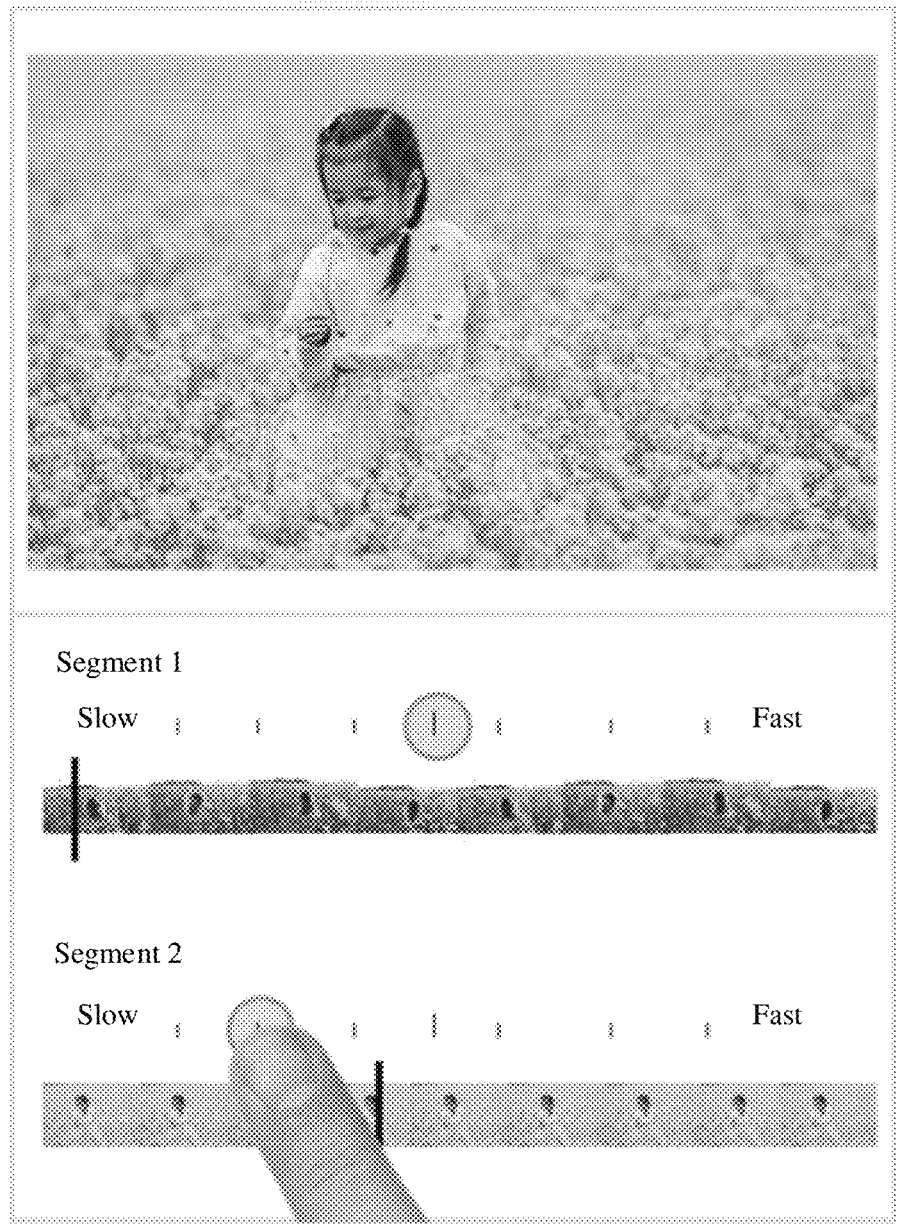

However, after the mobile phone with a foldable screen is unfolded, half of the display screen displays picture content in a video, and the other half of the display screen displays the video play speed bar 1201 and the video segment selection area 1202 in FIG. 12, for example, reference may be made to FIG. 16.

In FIG. 16, each video segment may separately correspond to one video play speed bar 1201. In this way, a play speed corresponding to each video segment may be clearly displayed, so as to improve user experience.

Figure 14:
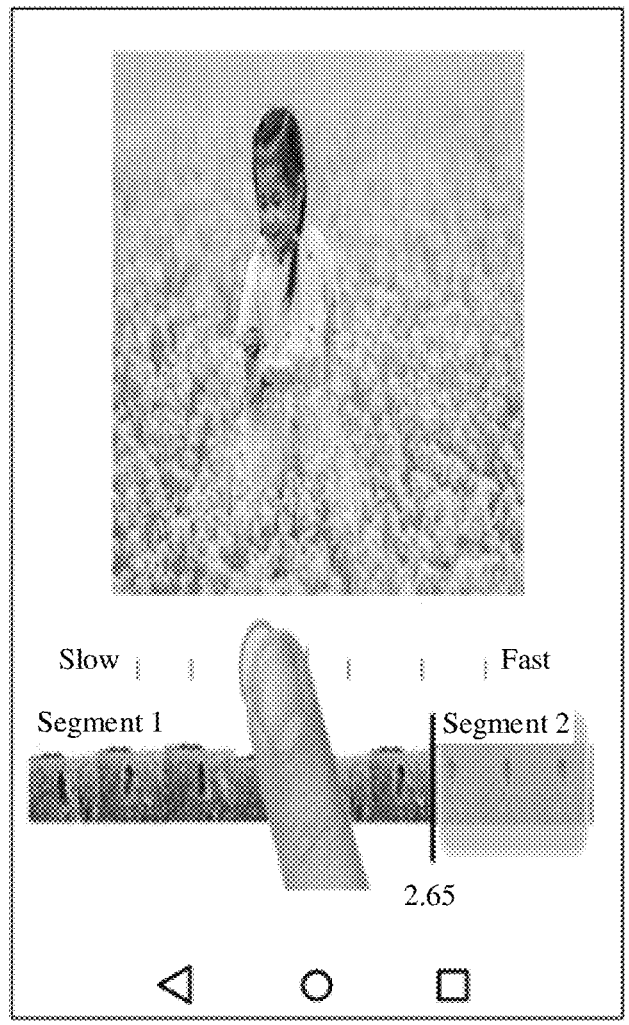

For operation of this embodiment, refer to FIG. 12 to FIG. 14. Details are not described herein again.

An embodiment provides a chip system, and the chip system includes at least one processor, a memory, and an interface circuit. The memory, the interface circuit, and the at least one processor are interconnected through a line. The at least one memory stores a computer program. When the computer program is executed by the processor, the method embodiment shown in FIG. 4 and another possible implemented method embodiment can be implemented.

An embodiment further provides a computer-readable storage medium. The computer-readable storage medium stores a computer program. When the computer program is run by a processor, the method embodiment shown in FIG. 4 and another possible implemented method embodiment can be implemented.

An embodiment further provides a computer program product. When the computer program product is run by a processor, the method embodiment shown in FIG. 4 and another possible implemented method embodiment can be implemented.

A person of ordinary skill in the art may understand that all or some of the procedures of the methods in the embodiments may be implemented by a computer program instructing relevant hardware. The program may be stored in a computer-readable storage medium. When the program is executed, the procedures of the methods in the embodiments may be performed. The foregoing storage medium includes: any medium that can store program code, such as a ROM or a random access memory (RAM), a magnetic disk, or an optical disc.

The foregoing description is merely an implementation, but is not intended to limit the scope of the embodiments. Any variation or replacement readily figured out by a person skilled in the art shall fall within the scope of the embodiments.

What is claimed is:

1. A video special effect generation method, comprising:
obtaining target information of a first video segment in a target video, wherein the target information comprises one or more of a content feature of the first video segment or a photographing parameter of the first video segment;
determining a first play speed of the first video segment based on the target information of the first video segment by:
determining a first video type of the first video segment based on the target information of the first video segment, wherein the target information comprises a photographing focal length of the first video segment that either falls within a first focal length range or a second focal length range, and
obtaining, through matching from a preset special effect mapping relationship and use of a machine learning model, the first play speed corresponding to the first video type of the first video segment, wherein the special effect mapping relationship defines a correspondence between each of a plurality of video types and each of a plurality of play speeds; and
adjusting a play speed of the first video segment to the first play speed.

2. The video special effect generation method according to claim 1, wherein the target information of the first video segment comprises the content feature of the first video segment, and the content feature of the first video segment comprises information about a picture scenario in the first video segment.

3. The video special effect generation method according to claim 1, wherein determining the first play speed of the first video segment based on the target information of the first video segment further comprises:
when the first video segment is a video type such as running water, rainy/snowy weather, or a close-up of an animal, determining that the first play speed is a slow motion play speed; and
when the first video segment is a video type such as a street or a natural scene, determining that the first play speed is a fast motion play speed.

4. The video special effect generation method according to claim 1,
when the photographing focal length falls within the first focal length range, determining that the first play speed is a slow motion play speed; and
when the photographing focal length falls within the second focal length range, determining that the first play speed is a fast motion play speed.

5. The video special effect generation method according to claim 1, wherein the target information of the first video segment comprises the content feature of the first video segment, and the content feature of the first video segment comprises photographing duration of the first video segment.

6. The video special effect generation method according to claim 1, wherein determining the first play speed of the first video segment based on the target information of the first video segment further comprises:
when the first video segment is a video type whose photographing duration falls within a first preset duration range, determining that the first play speed is a slow motion play speed; and
when the first video segment is a video type whose photographing duration falls within a second preset duration range, determining that the first play speed is a fast motion play speed.

7. The video special effect generation method according to claim 1, wherein the target information of the first video segment comprises the content feature of the first video segment, and the content feature of the first video segment comprises a picture change in the first video segment.

8. The video special effect generation method according to claim 1, wherein determining the first play speed of the first video segment based on the target information of the first video segment further comprises:
when the first video segment is a video type whose picture change speed falls within a first change speed range, determining that the first play speed is a slow motion play speed; and
when the first video segment is a video type whose picture change speed falls within a second change speed range, determining that the first play speed is a fast motion play speed.

9. The video special effect generation method according to claim 1, wherein the target information of the first video segment further comprises: information about a picture scenario in the first video segment, photographing duration of the first video segment, and a picture change in the first video segment; and
determining the first play speed of the first video segment based on the target information of the first video segment further comprises:
determining at least two play speed results of the first video segment based on the at least two types of information, wherein each play speed result is determined based on one of the at least two types of information; and
determining the first play speed of the first video segment based on the at least two play speed results.

10. The video special effect generation method according to claim 9, wherein the first play speed is a play speed that appears a maximum quantity of times in play speeds represented by the at least two play speed results.

11. The video special effect generation method according to claim 1, further comprising:
obtaining target information of a second video segment in the target video, wherein the target information comprises one or more of a content feature of the second video segment and a photographing parameter of the second video segment;
determining a second play speed of the second video segment based on the target information of the second video segment; and
adjusting a play speed of the second video segment to the second play speed.

12. The video special effect generation method according to claim 1, wherein obtaining the target information of the first video segment in the target video further comprises:
obtaining the target information of the first video segment in the target video in a process of photographing the target video.

13. A terminal, comprising:
a processor; and
a memory configured to store a computer program, wherein the processor is configured to invoke the computer program to perform the following operations:
obtaining target information of a first video segment in a target video, wherein the target information comprises one or more of a content feature of the first video segment and a photographing parameter of the first video segment;
determining a first play speed of the first video segment based on the target information of the first video segment, wherein the target information comprises a photographing focal length of the first video segment that either falls within a first focal length range or a second focal length range, by:
determining a first video type of the first video segment based on the target information of the first video segment, and
obtaining, through matching from a preset special effect mapping relationship and use of a machine learning model, the first play speed corresponding to the first video type of the first video segment, wherein the special effect mapping relationship defines a correspondence between each of a plurality of video types and each of a plurality of play speeds; and
adjusting a play speed of the first video segment to the first play speed.

14. The terminal according to claim 13, wherein the target information of the first video segment comprises the content feature of the first video segment, and the content feature of the first video segment comprises information about a picture scenario in the first video segment.

15. The terminal according to claim 13, wherein the processor is further configured to:
when the first video segment is a video type such as running water, rainy/snowy weather, or a close-up of an animal, determine that the first play speed is a slow motion play speed; and
when the first video segment is a video type such as a street or a natural scene, determine that the first play speed is a fast motion play speed.

16. The terminal according to claim 13, wherein the target information of the first video segment comprises the photographing parameter of the first video segment, and the photographing parameter of the first video segment comprises a photographing focal length of the first video segment.

17. The terminal according to claim 13, wherein the processor is further configured to:
when the photographing focal length falls within the first focal length range, determine that the first play speed is a slow motion play speed; and
when the photographing focal length falls within the second focal length range, determine that the first play speed is a fast motion play speed.

* * * * *